(12) United States Patent
Tabata et al.

(10) Patent No.: US 11,586,985 B2
(45) Date of Patent: Feb. 21, 2023

(54) VEHICLE CONTROL APPARATUS

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Tooru Matsubara, Toyota (JP); Hiromasa Tatsushiro, Toyota (JP); Kota Fujii, Nisshin (JP); Yuuki Makino, Togo-cho (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 235 days.

(21) Appl. No.: 17/108,446

(22) Filed: Dec. 1, 2020

(65) Prior Publication Data
US 2021/0174256 A1 Jun. 10, 2021

(30) Foreign Application Priority Data
Dec. 6, 2019 (JP) .............................. JP2019-221698

(51) Int. Cl.
*G06N 20/00* (2019.01)
*B60R 25/045* (2013.01)
(Continued)

(52) U.S. Cl.
CPC ........... *G06N 20/00* (2019.01); *B60R 25/045* (2013.01); *B60W 10/06* (2013.01); *B60W 10/113* (2013.01)

(58) Field of Classification Search
CPC ........ G06N 20/00; G06F 8/654; B60W 10/06; B60W 10/113; B60W 10/08; B60W 10/10;
(Continued)

(56) References Cited

U.S. PATENT DOCUMENTS 6,151,530 A   11/2000  Ino
6,546,321 B1 * 4/2003  Oh ...................... F02D 41/2493
                                                        714/10
(Continued)

FOREIGN PATENT DOCUMENTS

JP   H10-247103 A    9/1998
JP   2000-259420 A   9/2000
(Continued)

*Primary Examiner* — Phutthiwat Wongwian
*Assistant Examiner* — Sherman D Manley
(74) *Attorney, Agent, or Firm* — Oliff PLC

(57) ABSTRACT

A vehicle control apparatus for controlling a vehicle through a control program using at least one parameter. The at least one parameter is corrected by respective at least one correction value that is obtained after start of execution of a learning operation. The vehicle control apparatus includes: a learning-data storage portion configured to store, as learning data, the at least one correction value obtained after the start of the execution of the learning operation; and a learning-data rewrite portion configured, when the control program is updated, to execute a rewriting operation for rewriting the at least one correction value as the learning data from a pre-update correction value to a post-update correction value, such that the post-update correction value has the same sign as the pre-update correction value, and an absolute value of the post-update correction value is smaller than an absolute value of the pre-update correction value.

6 Claims, 13 Drawing Sheets

(51) Int. Cl.
*B60W 10/06* (2006.01)
*B60W 10/113* (2012.01)

(58) Field of Classification Search
CPC ............ B60W 2510/0604; B60W 2510/0638; B60W 2510/081; B60W 2520/30; B60W 2540/10; B60W 20/30; B60W 30/19; B60W 30/20; B60R 25/045; B60R 16/02; B60K 6/445; Y02T 10/62; F16H 2061/0087
See application file for complete search history.

(56) References Cited

U.S. PATENT DOCUMENTS

| | | |
|---|---|---|
| 11,273,845 B2 * 3/2022 | Sasade | B60W 10/11 |
| 11,274,742 B2 * 3/2022 | Tabata | F16H 59/68 |
| 11,305,781 B2 * 4/2022 | Tabata | F16H 59/72 |
| 2008/0172164 A1 7/2008 | Noda | |
| 2016/0104330 A1 * 4/2016 | Rudenko | G07C 5/0808 |
| | | 701/29.1 |
| 2019/0368602 A1 * 12/2019 | Sakaguchi | F16H 61/28 |
| 2021/0174614 A1 * 6/2021 | Tabata | F16H 57/0435 |
| 2022/0308531 A1 * 9/2022 | Takano | G05B 13/02 |

FOREIGN PATENT DOCUMENTS

| | | |
|---|---|---|
| JP | 2005-188331 A | 7/2005 |
| JP | 2008-169815 A | 7/2008 |

* cited by examiner

FIG.4

| | | Hydraulically-Operated Frictional Engagement Devices | | | | | Solenoid Valves | | | | | |
|---|---|---|---|---|---|---|---|---|---|---|---|---|
| | | C1 | C2 | B1 | B2 | F1 | SL1 | SL2 | SL3 | SL4 | SC1 | SC2 |
| P | | ○ | | | ○ | | ○ | | | ○ | ○ | ○ |
| Rev | | ○ | | | ○ | | ○ | | | ○ | ○ | ○ |
| N | | ○ | | | ○ | | ○ | | | ○ | ○ | |
| D | 1st | ○ | | | ○ | ○ | ○ | | | ○ | ○ | |
| | 2nd | ○ | | ○ | | | ○ | | ○ | | ○ | |
| | 3rd | ○ | ○ | | | | ○ | ○ | | | ○ | |
| | 4th | | ○ | ○ | | | | ○ | ○ | | ○ | |

FIG.10

| THROTTLE OPENING DEGREE θth[%] | CORRECTION VALUE CMP [A] LEARNED BY IN-FIELD LEARNING OPERATION |
|---|---|
| 0-25 | $\Delta Pc2-1$ |
| 25-50 | $\Delta Pc2-2$ |
| 50-75 | $\Delta Pc2-3$ |
| 75-100 | $\Delta Pc2-4$ |

VEHICLE CONTROL APPARATUS

This application claims priority from Japanese Patent Application No. 2019-221698 filed on Dec. 6, 2019, the disclosure of which is herein incorporated by reference in its entirety.

FIELD OF THE INVENTION

The present invention relates to a vehicle control apparatus for controlling a vehicle through a control program using at least one parameter, wherein the at least one parameter is corrected by respective at least one correction value that is obtained by a learning operation.

BACKGROUND OF THE INVENTION

There is known a vehicle control apparatus for controlling a vehicle through a control program. In a case in which the control program is updated (rewritten), if a pre-update learning value that has been obtained before update of the control program can be used, the control apparatus maintains the pre-update learning value, and if the pre-update learning value cannot be used, the control apparatus initializes the pre-update learning value or executes a data conversion operation for making the pre-update learning value usable. JP-2000-259420A discloses an example of such a control apparatus. This Japanese Patent Application publication does not teach specific contents of the data conversion operation as such, although teaching that predetermined mathematical expressions and correspondence tables are used in the data conversion operation.

SUMMARY OF THE INVENTION

However, in the case in which the control program is updated, even when the pre-update learning value is available, if the pre-update learning value is maintained and used in a control operation after the update of the control program, there is a risk that the vehicle could not be appropriately controlled in a stage shortly after the update of the control program.

The present invention was made in view of the background art described above. It is therefore an object of the present invention to provide a vehicle control apparatus configured, when a control program is updated, to use a correction value learned before update of the control program and to suppress a problem that the vehicle cannot be appropriately controlled in a stage shortly after the update of the control program.

The object indicated above is achieved according to the following aspects of the present invention.

According to a first aspect of the invention, there is provided a vehicle control apparatus for controlling a vehicle through a control program using at least one parameter, the at least one parameter being corrected by respective at least one correction value that is obtained after start of execution of a learning operation, the vehicle control apparatus comprising: a program storage portion configured to store the control program; a learning-data storage portion configured to store, as learning data, the at least one correction value obtained after the start of the execution of the learning operation; and a learning-data rewrite portion configured, when the control program is updated, to execute a rewriting operation for rewriting the at least one correction value as the learning data from a pre-update correction value to a post-update correction value, such that the post-update correction value has the same sign as the pre-update correction value, and an absolute value of the post-update correction value is smaller than an absolute value of the pre-update correction value.

According to a second aspect of the invention, in the vehicle control apparatus according to the first aspect of the invention, a post-update learning value, which is the at least one parameter corrected by the post-update correction value, is between a pre-update learning value, which is the at least one parameter corrected by the pre-update correction value, and a pre-learning set value which is the at least one parameter before the start of the execution of the learning operation.

According to a third aspect of the invention, in the vehicle control apparatus according to the first or second aspect of the invention, the learning-data rewrite portion is configured to change a difference between the pre-update correction value and the post-update correction value, depending on a degree of progress of the learning operation executed before update of the control program.

According to a fourth aspect of the invention, in the vehicle control apparatus according to any one of the first through third aspects of the invention, the at least one parameter includes a hydraulic-pressure command value that is to be applied to a transmission of the vehicle.

According to a fifth aspect of the invention, in the vehicle control apparatus according to any one of the first through fourth aspects of the invention, the at least one parameter consists of a plurality of parameters that are corrected by respective correction values as the at least one correction value, wherein the learning-data rewrite portion is configured, when executing the rewriting operation, to rewrite at least one of the correction values from the pre-update correction value to the post-update correction value.

According to a sixth aspect of the invention, in the vehicle control apparatus according to the first through fifth aspects of the invention, the vehicle includes a drive force source which is to be started when an ignition signal is placed in ON state, and which is to be stopped when the ignition signal is placed in OFF state, the vehicle control apparatus further comprising an ignition determination portion configured to determine whether the ignition signal has been switched from the OFF state to the ON state, and wherein the learning-data rewrite portion is configured, when it is determined by the ignition determination portion that the ignition signal has been switched from the OFF state to the ON state, to execute the rewriting operation.

The vehicle control apparatus according to the first aspect of the invention includes: (a) a program storage portion configured to store the control program; (b) a learning-data storage portion configured to store, as learning data, the at least one correction value obtained after the start of the execution of the learning operation; and (c) a learning-data rewrite portion configured, when the control program is updated, to execute a rewriting operation for rewriting the at least one correction value as the learning data from a pre-update correction value to a post-update correction value, such that the post-update correction value has the same sign as the pre-update correction value, and an absolute value of the post-update correction value is smaller than an absolute value of the pre-update correction value. Owing to this arrangement, as compared with an arrangement in which the same value of the pre-update correction value is used as the post-update correction value, a degree of influence of the pre-update correction value on the post-update correction value is reduced thereby making it possible to suppress a problem that the vehicle cannot be appropriately controlled in the stage shortly after the update of the control program.

In the vehicle control apparatus according to the second aspect of the invention, a post-update learning value, which is the at least one parameter corrected by the post-update correction value, is set between a pre-update learning value, which is the at least one parameter corrected by the pre-update correction value, and a pre-learning set value which is the at least one parameter before the start of the execution of the learning operation. This means that a degree of influence of the pre-learning set value on the post-update learning value is maintained while a degree of influence of the pre-update correction value on the post-update learning value is reduced. Owing to this arrangement, as compared with an arrangement in which the learning operation is executed from the beginning after the update of the control program, namely, is restarted from scratch after the update, it is possible to more easily suppress the problem that the vehicle cannot be appropriately controlled in the stage shortly after the update of the control program.

In the vehicle control apparatus according to the third aspect of the invention, the learning-data rewrite portion is configured to change a difference between the pre-update correction value and the post-update correction value, depending on a degree of progress of the learning operation executed before update of the control program. When the degree of progress of the learning operation is low, a degree of reliability of the pre-update correction value is likely to be low. When the degree of progress of the learning operation is high, the degree of reliability of the pre-update correction value is likely to be high. Therefore, the degree of influence of the pre-update correction value on the post-update correction value is changed depending on the degree of the progress of the learning operation executed before the update of the control program, namely, depending on the degree of reliability of the pre-update correction value. Owing to this arrangement taking account of the degree of reliability of the pre-update correction value, it is possible to more easily suppress the problem that the vehicle cannot be appropriately controlled in the stage shortly after the update of the control program.

In the vehicle control apparatus according to the fourth aspect of the invention, the at least one parameter includes a hydraulic-pressure command value that is to be applied to a transmission of the vehicle. Owing to this arrangement, it is possible to suppress increase of a shifting shock and/or an engaging shock of a lockup clutch when a shifting action is executed in the transmission in the stage shortly after the update of the control program.

In the vehicle control apparatus according to the fifth aspect of the invention, the at least one parameter consists of a plurality of parameters that are corrected by respective correction values as the at least one correction value, wherein the learning-data rewrite portion is configured, when executing the rewriting operation, to rewrite at least one of the correction values from the pre-update correction value to the post-update correction value. In the vehicle control apparatus according to this fifth aspect, upon update of the control program, the at least one of the correction values is determined or designated to be rewritten from the pre-update correction value to the post-update correction value. Owing to this arrangement, for example, with the at least one of the correction values, by which the parameter or parameters related to the update of the control program are to be corrected, being assigned to be rewritten upon the update of the control program, it will be possible to cause the other of the correction values, by which the parameter or parameters not related to the update of the control program are to be corrected, to be not assigned to be rewritten, so that each of the other of the correction values can be kept at the pre-update correction value even after the update of the control program.

In the vehicle control apparatus according to the sixth aspect of the invention, the vehicle control apparatus further comprising an ignition determination portion configured to determine whether the ignition signal has been switched from the OFF state to the ON state, wherein the learning-data rewrite portion is configured, when it is determined by the ignition determination portion that the ignition signal has been switched from the OFF state to the ON state, to execute the rewriting operation. Owing to this arrangement in which the learned correction value is rewritten when the ignition signal is switched from the OFF state to the ON state, it is possible to reduce an uncomfortable feeling given to a driver of the vehicle, as compared with an arrangement in which the correction value is rewritten during running of the vehicle.

BRIEF DESCRIPTION OF THE DRAWINGS

FIG. 4 is a table for explaining a relationship between each gear position of the step-variable transmission portion and a combination of hydraulically-operated frictional engagement devices of the step-variable transmission portion (which are placed in engaged states to establish the gear position), together with an operation state of each solenoid;

FIG. 10 is a view showing, by way of examples, a correction value of the drive current that has been learned in executions of the shift-up action from the second speed gear position to the third speed gear position in the step-variable transmission portion, wherein the correction value is stored for each range of a throttle valve opening degree;

DETAILED DESCRIPTION OF PREFERRED EMBODIMENTS

Hereinafter, preferred embodiments of the invention will be described in detail with reference to the accompanying drawings. The figures of the drawings are simplified or deformed as needed, and each portion is not necessarily precisely depicted in terms of dimension ratio, shape, etc.

First Embodiment

Figure 1:
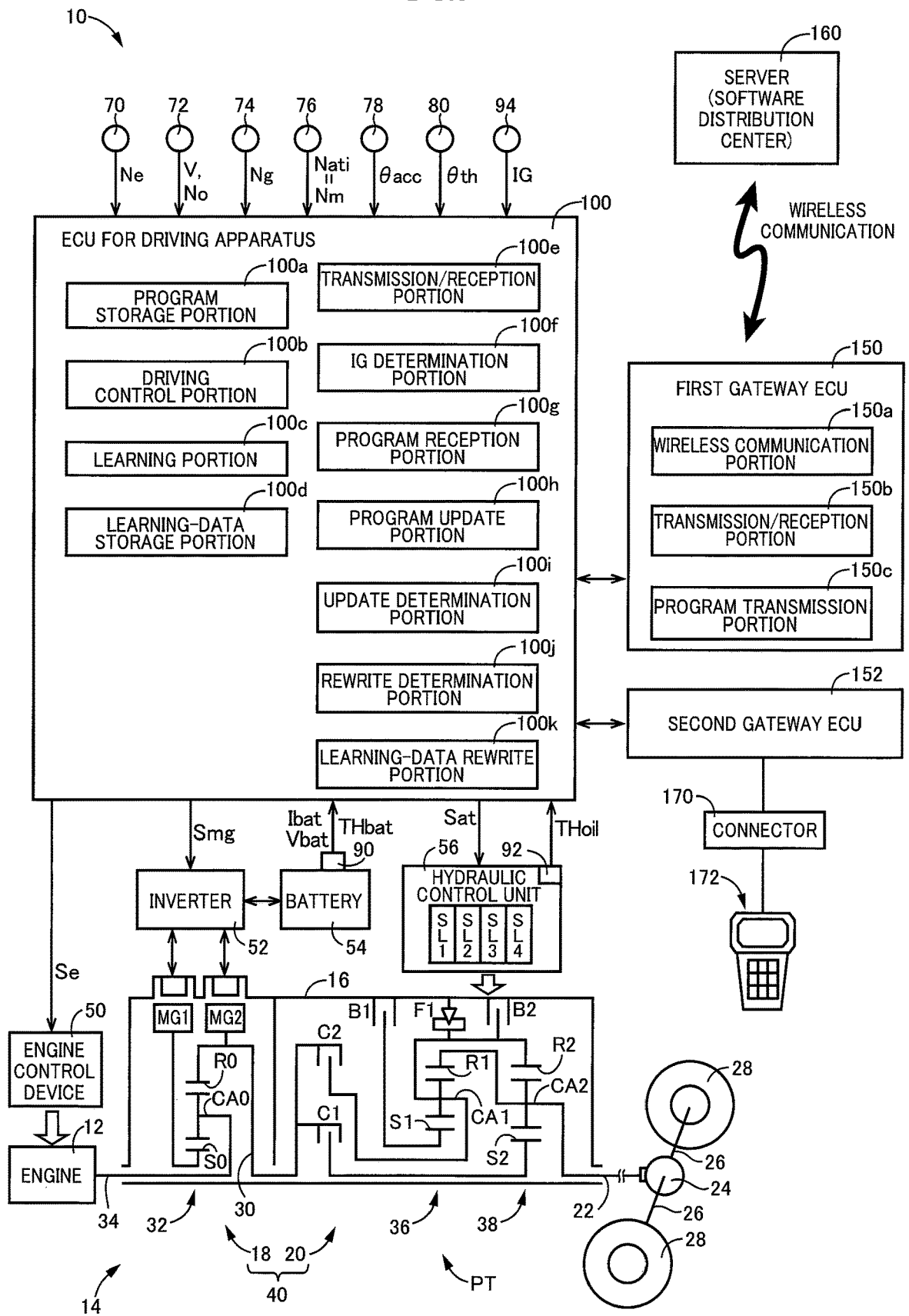
FIG. 1 is a view schematically showing a construction of a vehicle provided with an ECU for a driving apparatus, which is constructed according to a first embodiment of the present invention, and is a functional block diagram showing major portions of control functions for various control operations executed in the vehicle.

FIG. 1 is a view schematically showing a construction of a vehicle 10 provided with an ECU 100 for a driving apparatus, which is constructed according to a first embodiment of the present invention, and is a functional block diagram showing major portions of control functions for various control operations executed in the vehicle 10. The vehicle 10 is a hybrid vehicle, and includes an engine 12, a first rotating machine MG1, a second rotating machine MG2, a drive-force transmitting device 14, drive wheels 28, the above-described ECU 100 and first and second gateway ECUs 150, 152.

The engine 12 is constituted by an internal combustion engine such as gasoline engine and diesel engine, which serves as a drive force source for driving the vehicle 10. The vehicle 10 is provided with an engine control device 50 that includes an electronic throttle valve, a fuel injection device and an ignition device. With the engine control device 50 being controlled by the ECU 100, an engine torque Te [Nm], which is an output torque of the engine 12, is controlled.

Each of the first and second rotating machines MG1, MG2 is a rotating electric machine having a function serving as an electric motor and a function serving as a generator. That is, each of the first and second rotating machines MG1, MG2 is a so-called "motor generator", and can be a drive force source for driving the vehicle 10. The first and second rotating machines MG1, MG2 are connected to a battery 54 provided in the vehicle 10, through an inverter 52 provided in the vehicle 10. The inverter 52 is controlled by the ECU 100 whereby an MG1 torque Tg [Nm] and an MG2 torque Tm [Ng] as output torques of the respective first and second rotating machines MG1, MG2 are controlled. The output torque of each of the first and second rotating machines MG1, MG2 serves as a power running torque when acting as a positive torque for acceleration, with the each of the first and second rotating machines MG1, MG2 being rotated in a forward direction. The output torque of each of the first and second rotating machines MG1, MG2 serves as a regenerative torque when acting as a negative torque for deceleration, with the each of the first and second rotating machines MG1, MG2 being rotated in the forward direction. When each of the MG1 torque Tg and the MG2 torque Tm as the output torque of a corresponding one of the first and second rotating machines MG1, MG2 serves as the power running torque, a drive force outputted from the corresponding one of the first and second rotating machines MG1, MG2 is a drive force for driving the vehicle 10. The term "drive force" is synonymous with a drive torque or a drive power unless otherwise distinguished from them. The battery 54 is an electric storage device to and from which an electric power is supplied from and to the first rotating machine MG1 and the second rotating machine MG2. The battery 54 is a chargeable/dischargeable secondary battery such as a lithium-ion battery pack and a nickel-metal hydride battery pack. The first and second rotating machines MG1, MG2 are disposed inside a transaxle case 16 as a non-rotary member attached to a body of the vehicle 10.

The drive-force transmitting device 14 includes the above-described transaxle case 16, an electrically-operated continuously-variable transmission portion 18 and a mechanically-operated step-variable transmission portion 20. The continuously-variable transmission portion 18 and the step-variable transmission portion 20 are provided within the transaxle case 16, and are arranged in a series on a common axis. The continuously-variable transmission portion 18 is connected to the engine 12 directly or indirectly through, for example, a damper (not shown). The step-variable transmission portion 20 is connected to an output rotary member of the continuously-variable transmission portion 18. The drive-force transmitting device 14 further includes a differential gear device 24 connected to an output shaft 22 that is an output rotary member of the step-variable transmission portion 20, and a pair of axles 26 connected to the differential gear device 24. In the drive-force transmitting device 14, the drive force outputted from the engine 12 or the second rotating machine MG2 is transmitted to the step-variable transmission portion 20, and is then transmitted from the step-variable transmission portion 20 through the differential gear device 24, for example, to the drive wheels 28 of the vehicle 10. The drive-force transmitting device 14 constructed as described above is used advantageously for a vehicle of FR (front engine and rear drive) system. It is noted that the drive-force transmitting device 14 including the continuously-variable transmission portion 18 and the step-variable transmission portion 20 is constructed substantially symmetrically about its axis corresponding to the above-described common axis, so that a lower half of the drive-force transmitting device 14 is not shown in FIG. 1. The above-described common axis corresponds to axes of a crank shaft of the engine 12 and a connecting shaft 34 connected to the crank shaft. The continuously-variable transmission portion 18, step-variable transmission portion 20, differential gear device 24 and axles 26 of the drive-force transmitting device 14 cooperate to constitute a drive-force transmitting path PT provided between the engine 12 and the drive wheels 28.

The continuously-variable transmission portion 18 is provided with a differential mechanism 32 serving as a drive-force distributing device to mechanically distribute the drive force of the engine 12 to the first rotating machine MG1 and to an intermediate transmitting member 30 that is an output rotary member of the continuously-variable transmission portion 18. The first rotating machine MG1 is a rotating machine to which the drive force of the engine 12 is to be transmitted. The second rotating machine MG2 is connected to the intermediate transmitting member 30 in a drive-force transmittable manner. The intermediate transmitting member 30 is connected to the drive wheels 28 through the step-variable transmission portion 20, so that the second rotating machine MG2 is connected to the drive-force transmitting path PT in a drive-force transmittable manner. Thus, the second rotating machine MG2 is a rotating machine connected to the drive wheels 28 in a drive-force transmittable manner.

The differential mechanism 32 is a known planetary gear device of a single-pinion type having a sun gear S0, a carrier CA0 and a ring gear R0.

The step-variable transmission portion 20 is a mechanically-operated transmission mechanism that constitutes a part of the drive-force transmitting path PT between the intermediate transmitting member 30 and the drive wheels 28, namely, is an automatic transmission that constitutes a part of the drive-force transmitting path PT between the differential mechanism 32 and the drive wheels 28. The intermediate transmitting member 30 also serves as an input rotary member of the step-variable transmission portion 20. The step-variable transmission portion 20 is a known automatic transmission of a planetary gear type that is provided with a plurality of planetary gear devices in the form of a first planetary gear device 36 and a second planetary gear device 38, and a plurality of engagement devices including a clutch C1, a clutch C2, a brake B1, a brake B2 and a one-way clutch F1. Hereinafter, the clutch C1, clutch C2, brake B1 and brake B2 will be referred to as hydraulically-operated frictional engagement devices CB unless otherwise specified.

Each of the hydraulically-operated frictional engagement devices CB is a hydraulically-operated frictional engagement device in the form of a multiple-disc type or a single-disc type clutch or brake that is to be pressed by a hydraulic actuator, or a band brake that is to be tightened by a hydraulic actuator. The hydraulically-operated frictional engagement devices CB are selectively placed in engaged, slipped or released states as the operation states, depending on respective regulated hydraulic pressures outputted from a hydraulic control unit (hydraulic control circuit) 56 which is provided in the vehicle 10 and which is controlled by the ECU 100.

The first planetary gear device 36 is a known planetary gear device of a single-pinion type having a sun gear S1, a carrier CA1 and a ring gear R1. The second planetary gear device 38 is a known planetary gear device of a single-pinion type having a sun gear S2, a carrier CA2 and a ring gear R2.

The differential mechanism 32, first planetary gear device 36, second planetary gear device 38, hydraulically-operated frictional engagement devices CB, one-way clutch F1, first rotating machine MG1 and second rotating machine MG2 are connected to one another, as shown in FIG. 1.

The hydraulically-operated frictional engagement devices CB are controlled by the hydraulic control unit 56 that is provided in the vehicle 10. Specifically, an engaging torque, i.e., a torque capacity of each of the hydraulically-operated frictional engagement devices CB is changed by respective regulated engaging hydraulic pressures outputted from respective linear solenoid valves SL1-SL4 provided in the hydraulic control unit 56.

With a combination of the operation states of the respective hydraulically-operated frictional engagement devices CB being switched to another combination, the step-variable transmission portion 20 is shifted to a selected one of a plurality of AT gear positions (speed positions) having respective different gear ratios (speed ratios) $\gamma at$ (=AT input rotational speed Naiti [rpm]/AT output rotational speed Nato [rpm]). Namely, the step-variable transmission portion 20 is shifted up or down from one gear position to another by placing selected ones of the hydraulically-operated frictional engagement devices CB in the engaged states. The AT input rotational speed Nati is an input rotational speed of the step-variable transmission portion 20 that is a rotational speed of the input rotary member of the step-variable transmission portion 20, which is equal to a rotational speed of the intermediate transmitting member 30, and which is equal to an MG2 rotational speed Nm [rpm] that is an rotational speed of the second rotating machine MG2. The AT output rotational speed Nato is a rotational speed of the output shaft 22 that is an output rotary member of the step-variable transmission portion 20, which is considered to be an output rotational speed No [rpm] of a transmission device (composite transmission) 40 which essentially consists of the continuously-variable transmission portion 18 and the step-variable transmission portion 20. It is noted that the transmission device 40 including the step-variable transmission portion 20 corresponds to "transmission" that is recited in the appended claims.

Figure 2:
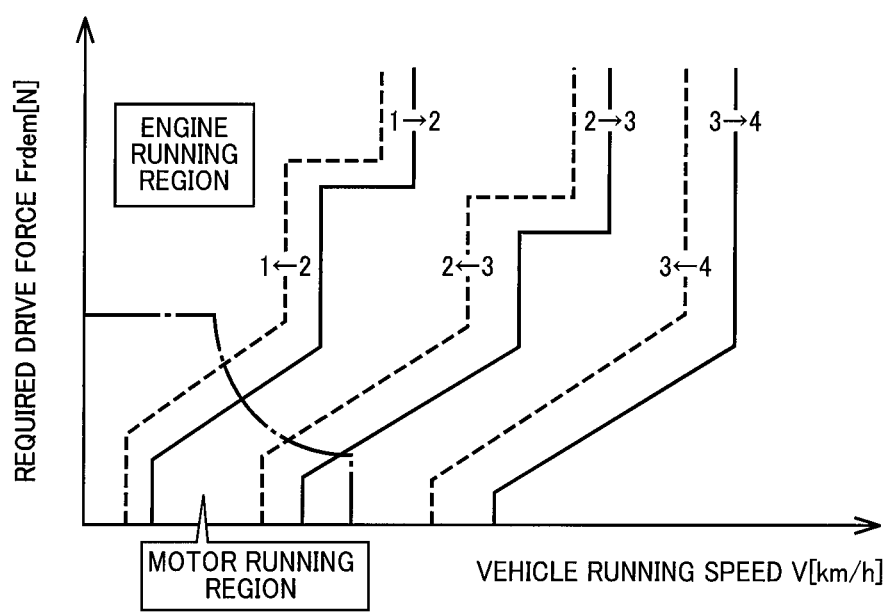
FIG. 2 is a view showing, by way of examples, a shifting map used for executing a shift control operation in a step-variable transmission portion, and a drive-force-source switching map used for executing a switch control operation for switching between an engine running and a motor running, wherein a relationship between the shifting map and the drive-force-source switching map is also shown in the view.

FIG. 2 is a view showing, by way of examples, a shifting map used for executing a shift control operation in the step-variable transmission portion 20, and a drive-force-source switching map used for executing a switch control operation for switching between an engine running and a motor running, wherein a relationship between the shifting map and the drive-force-source switching map is also shown in the view. The engine running is a running mode in which the vehicle 10 is driven to run by the engine 12 serving as the drive force source. The motor running is another running mode in which the vehicle 10 is driven to run by the first rotating machine MG1 or the second rotating machine MG2 serving as the drive force source without the engine 12 serving as the drive force source. The shift map and the drive-force-source switching map having two variables in the form of a vehicle running speed V [km/h] and a required drive force Frdem [N], which are shown in FIG. 2, are predetermined and stored in, for example, the EUC 100. When a point defined by a combination of actual values of the two variables, i.e., the running speed V and the required drive force Frdem is moved across one of shift-up lines (indicated by solid lines in FIG. 2) and shift-down lines (indicated by broken lines in FIG. 2) of the shift map, it is determined that the shift control operation is to be started. The motor running is executed in a low running speed range or a low load range that are defined by one-dot chain line in FIG. 2, wherein the low running speed range is a range in which the running speed V is relatively low and, in general, an engine efficiency is low, and the low load range is a range in which the required drive force Frdem is relative small. The motor running is established when a charged state value (charged capacity) SOC [%] of the battery 54 that is connected to the second rotating machine MG2 through the inverter 52 is not lower than a predetermined value. The step-variable transmission portion 20 establishes a selected one of the gear positons which is selected in accordance with the shifting map, whereby the vehicle 10 has a satisfactory fuel efficiency.

Figure 3:
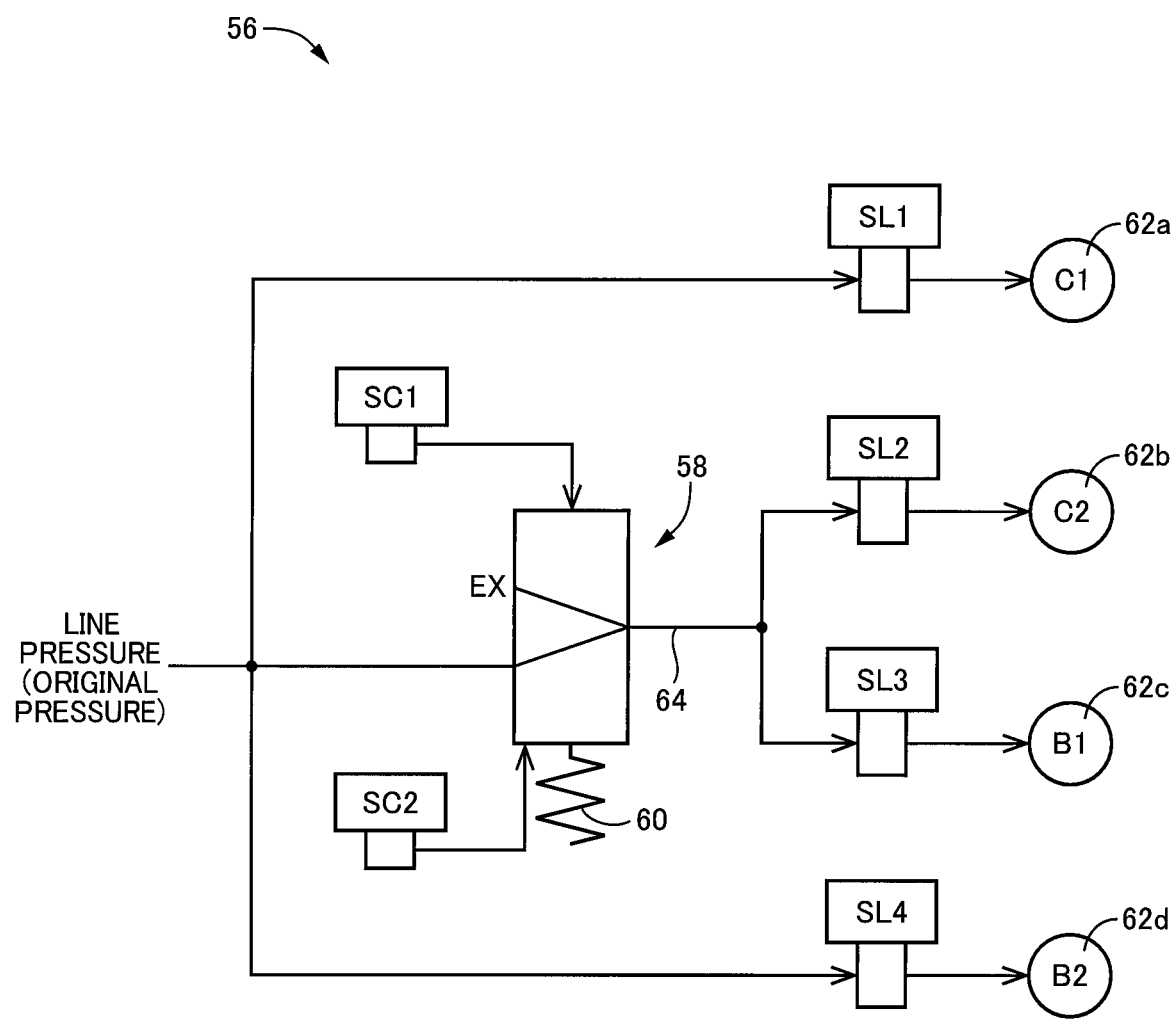
FIG. 3 is a hydraulic circuit diagram showing, by way of example, a part of a hydraulic control unit for executing a shift control operation in the step-variable transmission portion.

FIG. 3 is a hydraulic circuit diagram showing, by way of example, a part of the hydraulic control unit 56 for executing the shift control operation in the step-variable transmission portion 20.

The hydraulic control unit 56 includes the above-described linear solenoid valves SL1-SL4 (hereinafter referred simply to as "linear solenoid valves SL" unless there are to be distinguished from one another), solenoid valves SC1, SC2 (hereinafter referred simply to as "solenoid valves SC" unless there are to be distinguished from each other), and a switch valve 58, for controlling the engaging torques of the respective hydraulically-operated frictional engagement device CB as engaging elements provided in the step-variable transmission portion 20.

Each of the linear solenoid valves SL is an electromagnetic valve which is configured to receive, as an original pressure, a line pressure PL [Pa] regulated by a regulator valve (not shown) and to output a hydraulic pressure that is dependent on a hydraulic control command signal Sat supplied from the ECU 100 (see FIG. 1). That is, in the linear solenoid valve SL, the line pressure PL is controlled to the hydraulic pressure that is to be outputted from the linear solenoid valve SL, in accordance with an electromagnetic force of a solenoid of the linear solenoid valve SL that is controlled based on the hydraulic control command signal Sat.

The hydraulic pressure outputted from the linear solenoid valve SL1 is supplied to a hydraulic actuator 62a for controlling the operation state of the clutch C1. The hydraulic pressure outputted from the linear solenoid valve SL2 is supplied to a hydraulic actuator 62b for controlling the operation state of the clutch C2. The hydraulic pressure outputted from the linear solenoid valve SL3 is supplied to a hydraulic actuator 62c for controlling the operation state of the brake B1. The hydraulic pressure outputted from the linear solenoid valve SL4 is supplied to a hydraulic actuator 62d for controlling the operation state of the brake B2.

Each of the solenoid valves SC1, SC2 is to be operated based on based on the hydraulic control command signal Sat supplied from the ECU 100, so as to switch the switch valve 58 between its ON state and OFF state. When being placed in the ON state, the switch valve 58 is allowed to output the hydraulic pressure. When being placed in the OFF state, the switch valve 58 is inhibited from outputting the hydraulic pressure. Each of the solenoid valves SC1, SC2 is preferably a normally-closed ON-OFF valve.

When each of the solenoid valves SC1, SC2 is placed in its ON state, the hydraulic pressure is supplied from each of the solenoid valves SC1, SC2. When each of the solenoid valves SC1, SC2 is placed in its OFF state, the hydraulic pressure is not supplied from each of the solenoid valves SC1, SC2. The switch valve 58 is provided with a spring 60 that constantly forces or bias a spool valve element provided in the switch valve 58. When the solenoid valves SC1, SC2 are both placed in the respective OFF states, the switch valve 58 placed in the OFF state with the spool valve element being forced by a biasing force of the spring 60. When the solenoid valve SC1 is placed in the ON state and the solenoid valve SC2 is placed in the OFF state, the switch valve 58 placed in the ON state with the spool valve element being moved against the biasing force of the spring 60. When the solenoid valves SC1, SC2 are both placed in the respective ON states, the switch valve 58 placed in the OFF state with the spool valve element being forced by the biasing force of the spring 60.

That is, as shown in FIG. 3, when the solenoid valves SC1, SC2 are placed in the ON state and OFF state, respectively, in the hydraulic control unit 56, a supply source of the line pressure PL is brought into communication with a fluid passage 64 that is connected to the linear solenoid valves SL2, SL3. When both of the solenoid valves SC1, SC2 are placed in the ON states or OFF states, the fluid communication between the supply source of the line pressure PL (original pressure) and the fluid passage 64 is blocked while a drain port EX and the fluid passage 64 are brought into communication with each other.

FIG. 4 is a table for explaining a relationship between each gear position of the step-variable transmission portion 20 and a combination of the hydraulically-operated frictional engagement devices CB (that are to be placed in engaged states to establish the gear position), together with the operation state of each of the solenoids. In columns of "ENGAGEMENT DEVICE" of the table of FIG. 4, "O" indicates the engaged state of the corresponding engagement device CB, and blank indicates the released state of the corresponding engagement device CB. In columns of "SOLENOID VALVES" in the table of FIG. 4, "O" indicates that the hydraulic pressure is outputted from the corresponding solenoid valve, and blank indicates that the hydraulic pressure is not outputted from the corresponding solenoid valve.

Further, in FIG. 4, "P", "Rev", "N", "D" represent a parking range, a reverse range, a neutral range and a drive range, respectively, which are selectively selected by a manual operation of a shift lever. Each of the parking range and the neutral range is a non-driving range that is to be selected when the vehicle 10 is not driven to run. The reverse range is a driving range that is to be selected when the vehicle 10 is driven to run in reverse direction. The drive range is a driving range that is to be selected when the vehicle 10 is driven to run in forward direction. The linear solenoid valves SL and the solenoid valves SC are controlled so as to place each of the hydraulically-operated frictional engagement devices CB into the engaged or released state, as shown in FIG. 4. Depending on the combination of those of the hydraulically-operated frictional engagement devices CB, which are placed in the engaged states, one of the above-described parking range, reverse range, neutral range and drive range is established in the drive-force transmitting device 14 and one of the gear positions is established in the step-variable transmission portion 20.

Figure 5:
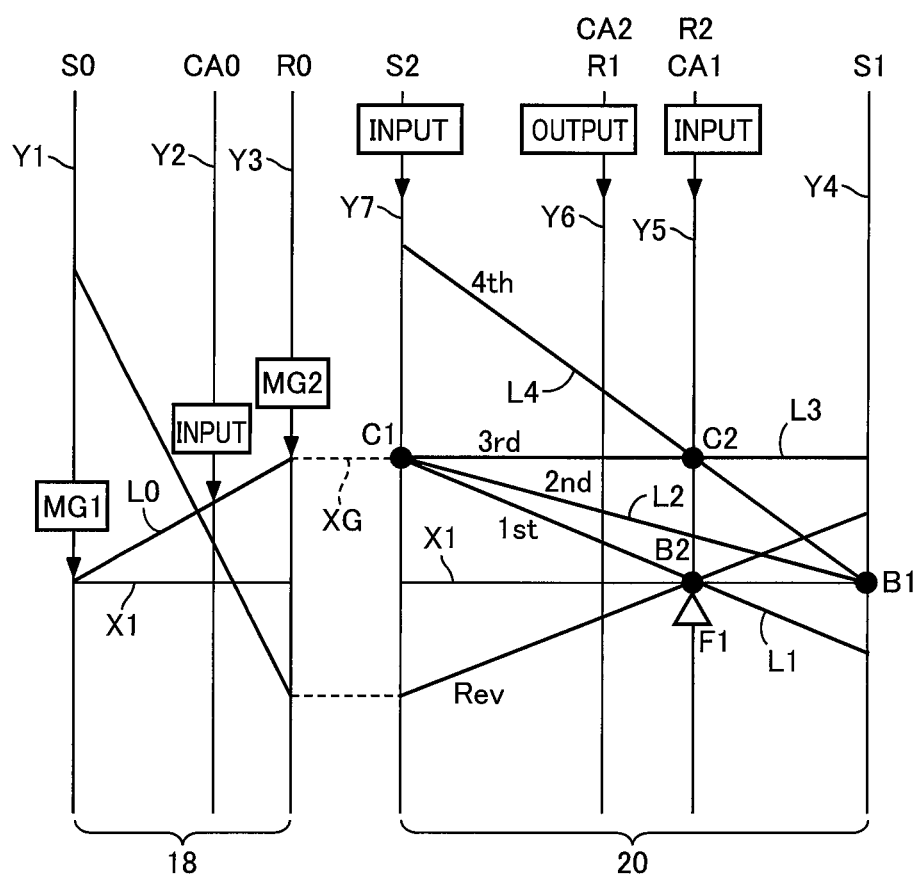
FIG. 5 is a collinear chart in which a relationship among rotational speeds of rotary elements of a drive-force transmitting device can be represented by straight lines, wherein a connection state of each of the rotary elements varies depending a gear position.

FIG. 5 is a collinear chart in which a relationship among rotational speeds of rotary elements of the drive-force transmitting device 14 can be represented by straight lines, wherein a connection state of each of the rotary elements varies depending the established gear position. The collinear chart of FIG. 5 is represented in two-dimensional coordinates in which its horizontal axis represents a relationship among gear ratios of the respective differential mechanism 32, first planetary gear device 36 and second planetary gear device 38 while its vertical axis represents the relationship among the rotational speeds of the rotary elements. A horizontal line X1 indicates a rotational speed of 0, and a horizontal line XG indicates a rotational speed of the intermediate transmitting member 30.

In the collinear chart of FIG. 5, three vertical lines Y1, Y2, Y3 are arranged in this order of description in rightward direction, and represent rotational speeds of the sun gear S0, carrier CA0 and ring gear R0, respectively. An interval between the vertical lines Y1, Y2, Y3 is determined in accordance with the gear ratio of the differential mechanism 32. Further, four vertical lines Y4, Y5, Y6, Y7 are arranged in this order of description in leftward direction, and represent rotational speeds of the sun gear S1, carrier CA1 (ring gear R2), ring gear R1 (carrier CA2) and sun gear S2, respectively. An interval between the vertical lines Y4, Y5, Y6, Y7 is determined in accordance with the gear ratios of the first and second planetary gear devices 36, 38.

In the collinear chart of FIG. 5, when the first speed gear position is established in the step-variable transmission portion 20, with the clutch C1 and the brake B2 (one-way clutch F1) being placed in the respective engaged states, the rotational speed of the output shaft 22 is represented by an intersection between the vertical line Y6 (that represents rotational speeds of the rotary elements connected to the output shaft 22) and a diagonal straight line L1 passing through an intersection between the vertical line Y7 and the horizontal line XG and another intersection between the vertical line Y5 and the horizontal line X1. When the second speed gear position is established in the step-variable transmission portion 20, with the clutch C1 and the brake B1 being placed in the respective engaged states, the rotational speed of the output shaft 22 is represented by an intersection between the vertical line Y6 (that represents rotational speeds of the rotary elements connected to the output shaft 22) and a diagonal straight line L2 passing through the intersection between the vertical line Y7 and the horizontal line XG and another intersection between the vertical line Y4 and the horizontal line X1. When the third speed gear position is established in the step-variable transmission portion 20, with the clutches C1, C2 being placed in the respective engaged states, the rotational speed of the output shaft 22 is represented by an intersection between the vertical line Y6 (that represents rotational speeds of the rotary elements connected to the output shaft 22) and a horizontal straight line L3 passing through the intersection between the vertical line Y7 and the horizontal line XG and another intersection between the vertical line Y5 and the horizontal line XG. When the fourth speed gear position is established in the step-variable transmission portion 20, with the clutch C2 and the brake B1 being placed in the respective engaged states, the rotational speed of the output shaft 22 is represented by an intersection between the vertical line 6 (that represent rotational speeds of the rotary elements connected to the output shaft 22) and a diagonal straight line L4 passing through the intersection between the vertical line Y5 and the horizontal line XG and the intersection between the vertical line Y4 and the horizontal line X1.

As described above, with change of the combination of those of the hydraulically-operated frictional engagement devices CB, which are placed in the engaged states, one of the gear positions established in the step-variable transmission portion 20 is switched to another one.

Referring back to FIG. 1, the vehicle 10 is provided with the ECU 100. The term "ECU" represents "electronic control unit", and consists of first letters of the respective three words. For example, the ECU 100 includes a so-called microcomputer incorporating a CPU, a ROM, a RAM and an input-output interface. The CPU is configured to control the driving apparatus including the engine 12, first and second rotating machines MG1, MG2 and drive-force transmitting device 14 of the vehicle 10, by processing various input signals, according to control programs stored in the ROM, while utilizing a temporary data storage function of the RAM. It is noted that the ECU 100 corresponds to "vehicle control apparatus" recited in the appended claims.

The ECU 100 receives various input signals based on values detected by respective sensors provided in the vehicle 10. Specifically, the electronic control apparatus 90 receives: an output signal of an engine speed sensor 70 indicative of an engine rotational speed Ne [rpm] which is a rotational speed of the engine 12; an output signal of an output speed sensor 72 indicative of an output-shaft rotational speed No [rpm] which is a rotational speed of the output shaft 22 and which corresponds to the running speed V of the vehicle 10; an output signal of a MG1 speed sensor 74 indicative of an MG1 rotational speed Ng [rpm] which is a rotational speed of the first rotating machine MG1; an output signal of a MG2 speed sensor 76 indicative of an MG2 rotational speed Nm [rpm] which is a rotational speed of the second rotating machine MG2; an output signal of an accelerator-opening degree sensor 78 indicative of an acceleration opening degree θacc [%] representing an amount of accelerating operation made by the vehicle driver; an output signal of a throttle-opening degree sensor 80 indicative of a throttle opening degree θth [%]; an output signal of a battery sensor 90 indicative of a battery temperature THba [° C.], a charging/discharging electric current that [A] and a voltage Vbat [V] of the battery 54; an output signal of a fluid temperature sensor 92 indicative of a working fluid temperature THoil [° C.] that is a temperature of a working fluid in the hydraulic control unit 56; and an ignition signal IG of an ignition switch 94 that is to be operated to start the drive force source, wherein the ignition signal IG is indicative of whether the drive force start is to be started or stopped.

The ECU 100 generates various output signals to the various devices provided in the vehicle 10, such as: an engine control command signal Se that is to be supplied to the engine control device 50 for controlling the engine 12; rotating-machine control command signals Smg that are to be supplied to the inverter 52 for controlling the first and second rotating machines MG1, MG2; and a hydraulic control command signal Sat that is to be supplied to the hydraulic control unit 56 for controlling the operation states of the hydraulically-operated frictional engagement devices CB.

The ECU 100 functionally includes a program storage portion 100a, a driving control portion 100b, a learning portion 100c and a learning-data storage portion 100d.

The program storage portion 100a stores therein control programs for controlling the driving apparatus.

The driving control portion 100b is configured to control operations of the engine 12 and first and second rotating machines MG1, MG2, in accordance with the control programs stored in the driving control portion 100b, and to execute a shift control operation for shifting the step-variable transmission 20 from one of the gear positions to another one of the gear positions.

The learning portion 100c is configured to execute learning operations for learning correction values by which parameters (that are to be used in executions of the control programs) are to be corrected. The learned correction values are stored in the learning-data storage portion 100d that is constituted by, for example, a non-volatile memory. The parameters subjected to the learning operations are corrected by the learned correction values, and the corrected parameters are used as learning values LRN in executions of the control programs.

Hereinafter, as an example of learning of parameters used in executions of the control programs, there will be described learning of a drive current IDR [A] of one of the linear solenoid valves SL involved in the shift control operation for shifting the step-variable transmission 20 from one of the gear positions to another one of the gear positions.

Figure 6:
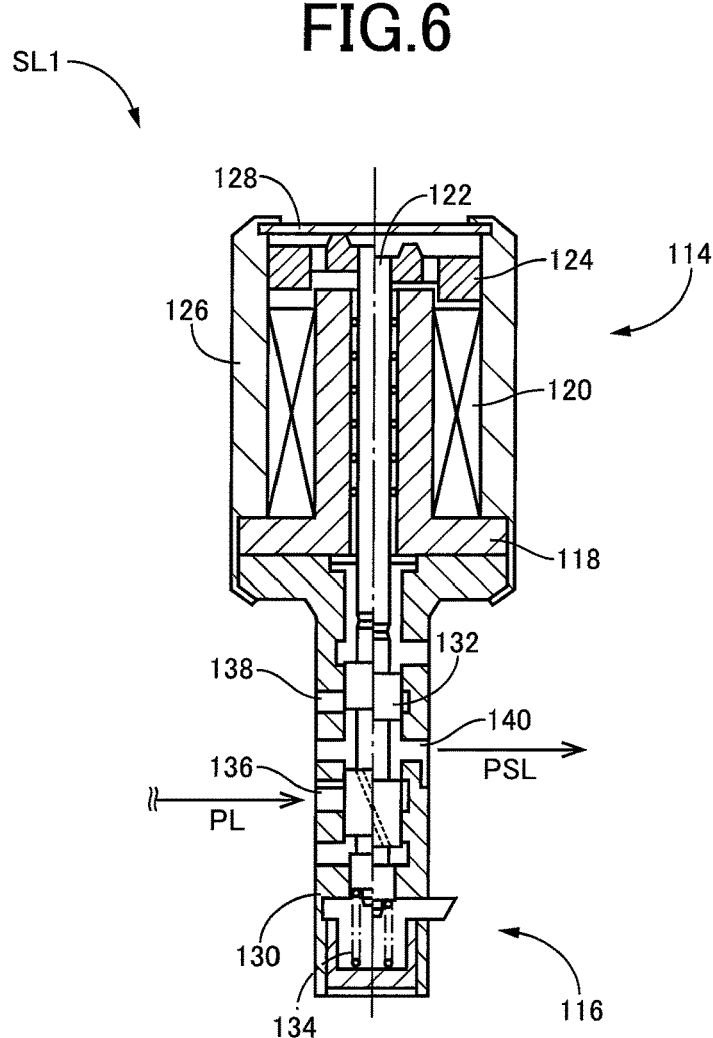
FIG. 6 is a cross sectional view for explaining a construction of a linear solenoid valve provided in the hydraulic control unit.

FIG. 6 is a cross sectional view for explaining a construction of a linear solenoid valve SL provided in the hydraulic control unit 56. FIG. 6 shows, by way of example, the linear solenoid valve SL1 as a representative of the linear solenoid valves SL1-SL4 that are provided in the hydraulic control unit 56, since the linear solenoid valves SL1-SL4 are substantially identical in construction with one another. The linear solenoid valve SL1 includes a solenoid portion 114 configured, when being energized, to covert an electric energy into a drive force, and a regulator portion 116 configured, when being driven by the solenoid portion 114, to regulate the line pressure PL as an input pressure so as to generate a certain output pressure PSL [Pa].

The solenoid portion 114 includes a cylindrical-tubular-shaped winding core 118, a coil 120 constituted by a conductor cable wound on a periphery of the winding core 118, a core 122 provided to be axially movable inside the winding core 118, a plunger 124 fixed to one of axially opposite end portions of the core 122 which is remote from the regulator portion 116, a casing 126 storing therein the winding core 118, coil 120, core 122 and plunger 124, and a cover 128 fitted in an opening of the casing 126.

The regulator portion 116 includes a sleeve 130 fitted in the casing 126, a spool valve element 132 provided to be axially movable inside the sleeve 130, and a spring 134 constantly forces or biases the spool valve element 132 toward the solenoid portion 114. The spool valve element 132 is in contact, at one of axially opposite end portions which is on a side of the solenoid portion 114, with the other of the above-described axially opposite end portions of the core 122, namely, with one of the above-described axially opposite end portions of the core 122, which is on a side of the regulator portion 116.

Figure 7:
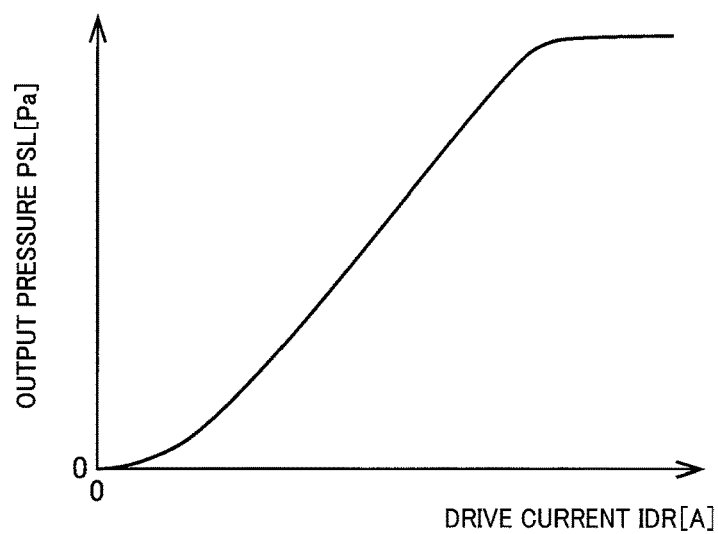
FIG. 7 is a view showing, by way of example, a valve characteristic of the linear solenoid valve in the form of a relationship between a drive current and an output pressure in the linear solenoid valve.

In the solenoid valve SL1 constructed as described above, with the drive current IDR being applied to the coil 120, the plunger 124 is moved by a distance that is dependent on an amount of the applied electric current IDR, in an axial direction of the plunger 124, core 122 and spool 132 that are coaxial with one another, and the core 122 and the spool 132 are moved together with the plunger 124 in the same axial direction. With the axial movement of the spool 132, a rate of flow of the working fluid introduced through an inlet port 136 and a rate of flow of the working fluid discharged through a drain port 138 are adjusted, so that the line pressure PL (original pressure) inputted through the inlet port 136 is regulated to an output pressure PSL corresponding to the drive current IDR, in accordance with the valve characteristic, which is a relationship, as shown in FIG. 7 by way of example, between the drive current IDR and the output pressure PSL. The output pressure PSL is outputted through an outlet port 140.

Figure 8:
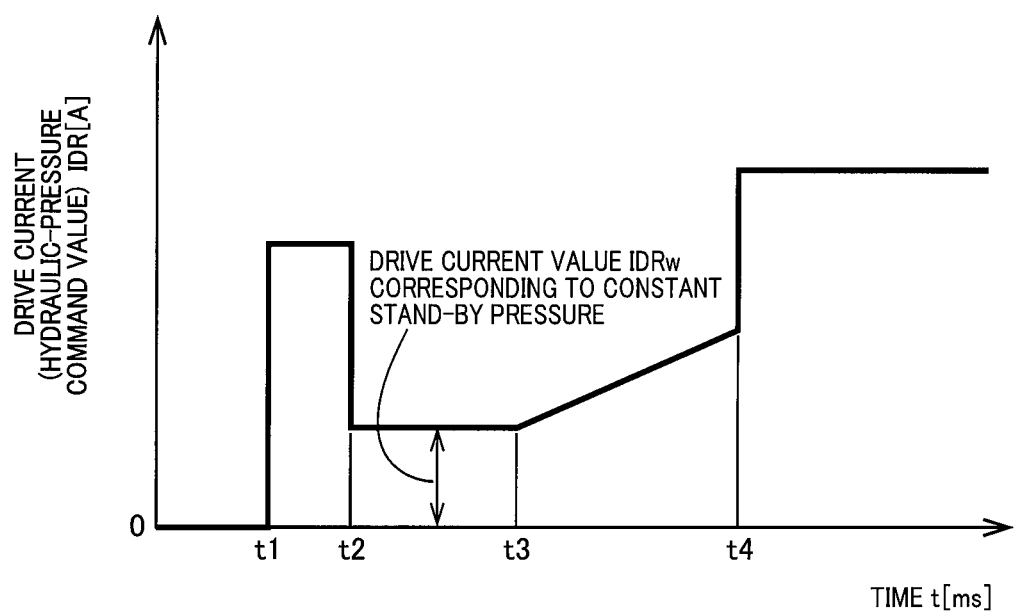
FIG. 8 is a time chart for explaining, by way of example, an operation of the linear solenoid valve during execution of a shifting action of the step-variable transmission portion, more specifically, showing, by way of example, a change of the drive current applied to the linear solenoid valve of the hydraulically-operated frictional engagement device that is to be engaged in the shifting action of the step-variable transmission portion.

FIG. 8 is a time chart for explaining, by way of example, an operation of the linear solenoid valve SL during execution of a shifting action of the step-variable transmission portion 20, more specifically, showing, by way of example, a change of the drive current IDR applied to the linear solenoid valve SL of the engaging-side hydraulically-operated frictional engagement device CB that is to be engaged in the shifting action of the step-variable transmission portion 20. Since the output pressure PSL of the linear solenoid valve SL is dependent on the drive current IDR applied to the linear solenoid valve SL, as shown in FIG. 7, the drive current IDR can be a hydraulic-pressure command value for the output pressure PSL.

As shown in FIG. 8, in a period (quick filling period) from a time point t1 to a time point t2, the drive current IDR is temporarily increased to eliminate a pack clearance, namely, so as to initiate an engagement contact of input and output elements of the hydraulically-operated frictional engagement device CB. Then, in a period (constant stand-by pressure period) from the time point t2 to a time point t3, the drive current IDR is kept at a current value corresponding to a constant stand-by pressure by which the engagement device CB is held in its engagement stand-by state. Then, in a period (sweep period) from the time point t3 to a time point t4, the drive current IDR is gradually increased so as to gradually increase the engaging torque of the engagement device CB. At the time point t4 at which a synchronization is determined, the drive current IDR is increased to its maximum value. In the time chart of FIG. 8, a relationship between the drive current IDR and the time t [ms] in process of engagement of the hydraulically-operated frictional engagement device CB is shown, wherein the drive current IDR is one of the above-described parameters used for the shift control operation for shifting the step-variable transmission portion 20 from one of the gear positions to another one of the gear positions.

There is a variation among the linear solenoid valves SL in terms of the valve characteristic, and there is a variation among the hydraulically-operated frictional engagement devices CB in terms of engagement characteristic, too. Thus, for suppressing influence by the characteristic variations among the linear solenoid valves SL and among the engagement devices CB, the learning operation is executed to correct the drive current IDR applied to the linear solenoid valve SL. For example, a drive current value IDRw [A] corresponding to the constant stand-by pressure of the engaging-side hydraulically-operated frictional engagement device CB is the parameter subjected to the learning operation. It is noted that the drive current value IDRw corresponding to the constant stand-by pressure of the engaging-side hydraulically-operated frictional engagement device CB corresponds to "hydraulic-pressure command value" recited in the appended claims.

The learning operation is categorized into an in-factory learning operation and an in-field learning operation (that may be referred to as "running learning operation"). The in-factory learning operation is to be executed with the engine 12 being operated in a factory, prior to shipment of the vehicle 10, or prior to delivery of the vehicle 10 after the transmission device 40 including the step-variable transmission portion 20 has been repaired or replaced by a new one. The in-field learning operation is to be executed during running of the vehicle 10 after shipment of the vehicle 10 from a factory or after delivery of the vehicle 10 that has been repaired.

The in-factory learning operation is executed to measure a shifting shock in a case in which a standard current value STN [A] is applied as the drive current value IDRw to the linear solenoid valve SL, and to correct the drive current value IDRw for thereby reducing the shifting shock. The shifting shock is caused by a factor such as a tie-up of the step-variable transmission portion 20 and a racing (blowing-up) of the engine rotational speed Ne. For example, a degree of racing of the engine rotational speed Ne [rpm] (such as a racing amount Neblow and a racing time TMeblow shown in FIG. 9) is detected as an amount or a time of a temporary increase of the engine rotational speed Ne in process of the shifting action. By execution of the in-factory learning operation, the drive current value IDRw is corrected from the standard current value STN to a corrected current value that is obtained by adding an in-factory correction amount to the standard current value STN. The corrected current value, which is obtained by adding the in-factory correction amount to the standard current value STN, is stored as a set value SET [A] before the in-field learning operation, into the learning-data storage portion 100d. It is noted that the set value SET corresponds to "pre-learning set value" recited in the appended claims.

The in-field learning operation is executed based on a result of actual execution of the shift control operation during actual running of the vehicle 10. Specifically, in the execution of the shift control operation during the actual running of the vehicle 10 in which the set value SET as the drive current value IDRw is outputted to one of the linear solenoid valves SL1-SL4 corresponding to the hydraulically-operated frictional engagement device CB that is involved in the shifting action, namely, that is released or engaged in the shifting action, it is determined whether the racing is caused or not, namely, the racing amount is detected, and the drive current value IDRw is corrected from the set value SET to a corrected current value such that the detected degree of racing becomes close to a predetermined target amount. The in-field learning operation, which is executed to correct the drive current value IDRw of the linear solenoid valve SL so as to cause the detected degree of racing to become close to the predetermined target amount, will be described later. In the in-field learning operation, a correction amount is calculated in each one execution of the learning operation, and the drive current value IDRw is increased or reduced by the calculated correction amount in the learning operation that is executed each time when the shifting action is executed during the running of the vehicle 10. Thus, as a result of repeated execution of the in-field learning operation, the drive current value IDRw is corrected from the set value SET to a learning value LRN [A] that is obtained by adding a correction value CMP [A] to the set value SET, wherein the correction value CMP [A] is a total of the correction amounts that are calculated in the respective executions of the in-field learning operation. As described above, the correction value CMP learned in the in-field learning operation is stored in the learning-data storage portion 100d. With increase of the number Nsft of times of the shifting action, namely, with increase of the number of times of the execution of the in-field learning operation, the corrected drive current value IDRw is eventually converged into a certain range. It is noted that the in-field learning operation and the correction value CMP correspond to "learning operation" and "correction value" that are recited in the appended claims.

Figure 9:
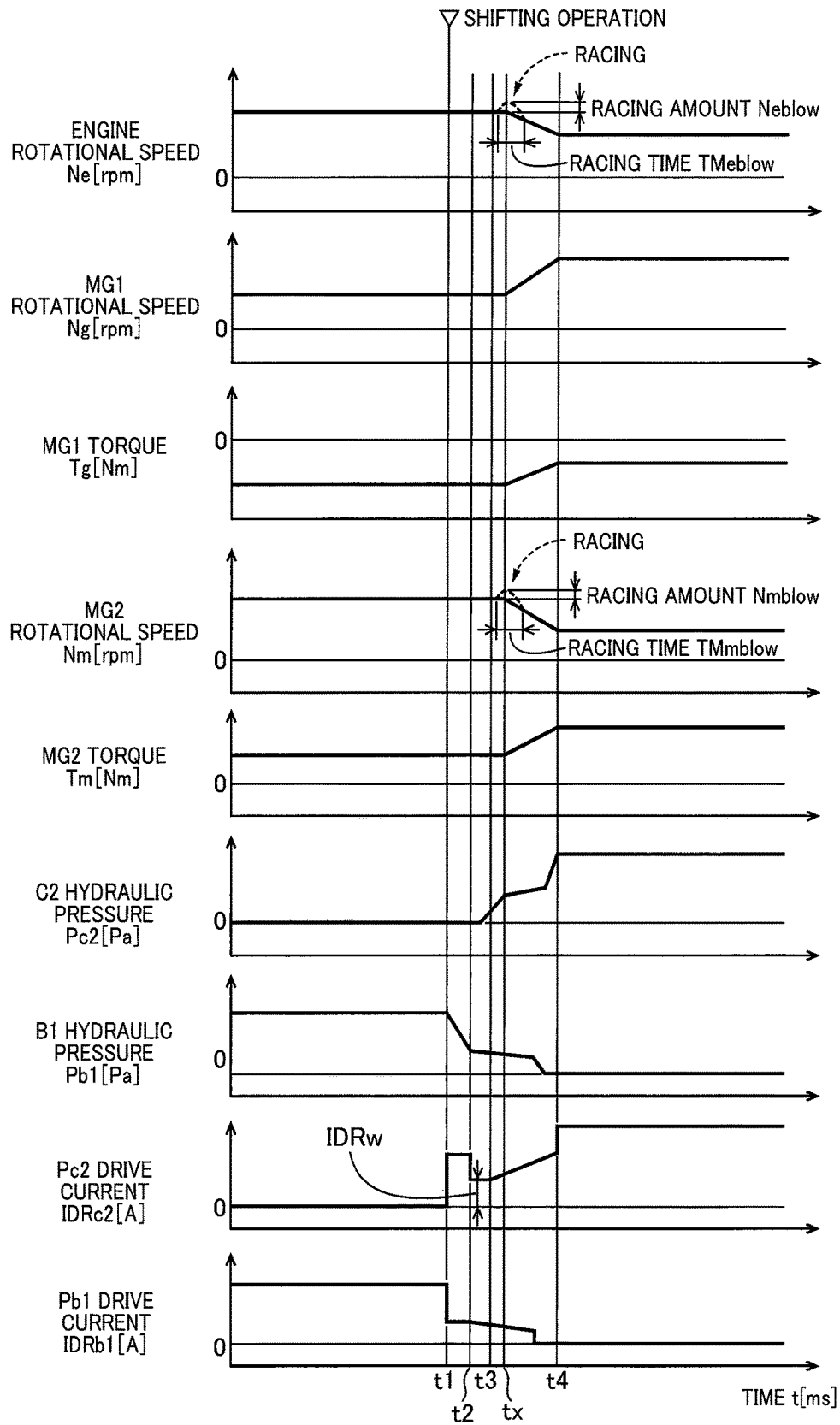
FIG. 9 is a time chart for explaining, by way of example, a in-field learning operation executed when a shift-up action from a second speed gear position to a third speed gear position is executed in the step-variable transmission portion.

FIG. 9 is a time chart for explaining, by way of example, the in-field learning operation executed when a shift-up action from the second speed gear position to the third speed gear position is executed in the step-variable transmission portion 20. In FIG. 9, a state without occurrence of the racing is represented by solid lines, while a state with occurrence of the racing is represented by broken lines. In FIG. 9, its horizontal axes represent a time t [ms], while its vertical axes represent the engine rotational speed Ne, the MG1 rotational speed Ng, the MG1 torque Tg, the MG2 rotational speed Nm, the MG2 torque Tm, a C2 hydraulic pressure Pc2 [Pa] supplied to the hydraulic actuator 62b by which an operation state of the clutch C2 is controlled, a B1 hydraulic pressure Pb1 [Pa] supplied to the hydraulic actuator 62c by which an operation state of the brake B1 is controlled, a Pc2 drive current IDRc2 [A] that is the hydraulic-pressure command value for the C2 hydraulic pressure Pc2 and a Pb1 drive current IDRb1 [A] that is the hydraulic-pressure command value for the B1 hydraulic pressure Pb1 (as seen from top to bottom). The learning operation is executed for learning the drive current value IDRw (corresponding to the constant stand-by pressure) of the Pc2 drive current IDRc2 for the C2 hydraulic pressure Pc2 supplied to the hydraulic actuator 62b by which the operation state of the clutch C2 as the engaging-side hydraulically-operated frictional engagement device is controlled.

In FIG. 9, a so-called "clutch-to-clutch" shifting operation starts to be executed at a time point t1. In a period from the time point t1 to a time point t4, the Pc2 drive current IDRc2 for the C2 hydraulic pressure Pc2 supplied to the hydraulic actuator 62b by which the operation state of the clutch C2 as the engaging-side hydraulically-operated frictional engagement device is controlled, is changed from a low state to a high state, as shown in the time chart of FIG. 8. Meanwhile, in the period from the time point t1 to the time point t4, the Pb drive current IDRb1 for the B1 hydraulic pressure Pb1 supplied to the hydraulic actuator 62c by which the operation state of the brake B1 as a releasing-side hydraulically-operated frictional engagement device is controlled, is changed from a high state to a low state. At a time point tx (t1<tx<t4) at which the "clutch-to-clutch" shifting operation is executed, the in-field learning operation is executed such that the degree of racing of the engine rotational speed Ne (such as the racing amount Neblow and the racing time TMeblow) is held in a predetermined target range, or such that the degree of racing of the MG2 rotational speed Nm (such as a racing amount Nmblow and the racing time TMmblow) is held in a predetermined target range. Each of the racing amount Nmblow and the racing time TMmblow is detected as an amount or a time of a temporary increase of the MG2 rotational speed Nm in process of the shifting action. Each of the predetermined target ranges for the degree of racing of the engine rotational speed Ne and the degree of racing of the MG2 rotational speed Nm is a range that is determined through experimentation or determined by an appropriate design theory, such that the shifting shock and a length of time required to complete the shifting action are in respective permissible ranges.

Specifically, when the degree of racing of the engine rotational speed Ne or the degree of racing of the MG2 rotational speed Nm is larger than the predetermined target range, it is assumed that an engaging action of the clutch C2 is delayed relative to a releasing action of the brake B1 thereby causing a certain length of period in which neither the brake B1 nor the clutch C2 has a transmission torque. In this case, there is a risk of generation of the shift shock and increase of the length of time required to complete the shifting action. Therefore, in the next execution of the shift control operation, the drive current value IDRw is made larger than the drive current value IDRw in the present execution of the shift control operation by a correction amount as a predetermined amount by which the drive current value IDRw is to be changed in each one execution of the learning operation. That is, in the next execution of the shift control operation, the drive current value IDRw is made larger than the drive current value IDRw in the present execution of the shift control operation, by the correction amount. On the other hand, when the degree of racing of the engine rotational speed Ne or the degree of racing of the MG2 rotational speed Nm is smaller than the predetermined target range, it is assumed that the engaging action of the clutch C2 and the releasing action of the brake B1 overlap with each other thereby causing the tie-up in which both of the brake B1 and the clutch C2 have transmission torques and causing a risk of generation of the shifting shock. Therefore, in the next execution of the shift control operation, the drive current value IDRw is made smaller than the drive current value IDRw in the present execution of the shift control operation by the correction amount as the predetermined amount by which the drive current value IDRw is to be changed in each one execution of the learning operation. That is, in the next execution of the shift control operation, the drive current value IDRw is made smaller than the drive current value IDRw in the present execution of the shift control operation, by the correction amount. The in-field learning operation is thus executed in a repeated manner whereby the drive current value IDRw is corrected such that the shifting action is executed with the shifting shock and the length of time required to complete the shifting action being in the respective permissible ranges. With the drive current value IDRw as the parameter subjected to the learning operation being corrected by execution of the in-field learning operation, the vehicle 10 is controlled such that with the shifting shock and the length of time required to complete the shifting action are in the respective permissible ranges, namely, the vehicle 10 is appropriately controlled. The expression "the vehicle 10 is appropriately controlled" is interpreted to mean that the vehicle 10 is controlled in a state in which variations of characteristics of component parts of the vehicle 10 (such as variation of the valve characteristics of the linear solenoid valves SL and variation of the engagement characteristics of the hydraulically-operated frictional engagement devices CB) are suppressed by execution of the in-field learning operation.

The in-field learning operation is executed for each of all running ranges, i.e., for each of all ranges of the throttle valve opening degree θth (or the accelerator opening degree θacc), so that the in-field learning operation is executed for each of the ranges in a repeated manner, and the correction value CMP as the total of the correction amounts in the respective executions of the in-field learning operation is learned and stored for each of the ranges of the throttle valve opening degree θth (or the accelerator opening degree θacc).

FIG. 10 is a view showing, by way of examples, the correction value CMP of the Pc2 drive current IDRc2 that has been learned in executions of the shift-up action from the second speed gear position to the third speed gear position in the step-variable transmission portion 20, wherein the correction value CMP is stored for each range of the throttle valve opening degree θth. As shown in FIG. 10, the throttle valve opening degree θth is divided into four ranges that consist of a range not smaller than 0 [%] and smaller than 25 [%], a range not smaller than 25 [%] and smaller than 50 [%], a range not smaller than 50 [%] and smaller than 75 [%], and a range not smaller than 75 [%] and not larger than 100 [%]. For the four ranges of the throttle valve opening degree θth, the respective correction values CMP, i.e., a value ΔPc2-1, a value ΔPc2-2, a value ΔPc2-3 and a value ΔPc2-4 are learned by the in-field learning operation. The drive current value IDRw, which is the parameter that is to be used in execution of a corresponding one of the control programs, is corrected by a corresponding one of the correction values CMP (the value ΔPc2-1, value ΔPc2-2, value ΔPc2-3 and value ΔPc2-4) learned by the in-field learning operation, for each range of the throttle valve opening degree θth. It is noted that not only the drive current value IDRw corresponding to the constant stand-by pressure of the engaging-side hydraulically-operated frictional engagement device CB in case of shifting action of the step-variable transmission portion 20 from the second speed gear position to the third speed gear position but also that in case of shifting action of the step-variable transmission portion 20 from any other position other than the second speed gear position to another gear position is the parameter subjected to the learning operation for each range of the throttle valve opening degree θth. Thus, there are plurality of parameters subjected to the learning operation, and the correction value CMP is learned for each one of the plurality of parameters.

By the way, there is a case in which each of the control programs (by which the vehicle 10 is to be controlled) is rewritten or updated, for example, when an updated version of the control program is available or when the transmission device 40 including the step-variable transmission portion 20 has been repaired.

Like the ECU 100 for the driving apparatus, each of the first and second gateway ECUs 150, 152 shown in FIG. 1 includes a so-called microcomputer incorporating a CPU, a ROM, a RAM and an input-output interface. When an updated control program is transmitted to the ECU 100 through the first gateway ECU 150 or second gateway ECU 152, a corresponding one of the control programs stored in the program storage portion 100a of the ECU 100 is updated. The first gateway ECU 150 is capable of communicating with a server (software distribution center) 160 through a wireless communication, so as to receive the updated control program from the server 160 and transmit the updated control program to the ECU 100. The second gateway ECU 152 is connectable to an update tool 172 through a connector 170, so as to receive the updated control program from the update tool 172 and transmit the updated control program to the ECU 100. Each of the server 160 and the update tool 172 is a computer incorporating, for example, a program for supplying the updated control program (software) to the vehicle 10, a CPU configured to execute the program and a storage device storing the updated control program.

The ECU 100 has an updating control function for updating the control programs. Hereinafter, in connection with the updating control function, there will be described, by way of example, a case in which the updated control program is transmitted from the first gateway ECU 150 to the ECU 100.

The ECU 100 functionally includes a transmission/reception portion 100e, an IG (ignition) determination portion 100f, a program reception portion 100g, a program update portion 100h, a rewrite determination portion 100j and a learning-data rewrite portion 100k. The first gateway ECU 150 functionally includes a wireless communication portion 150a, a transmission/reception portion 150b and a program transmission portion 150c. It is noted that the ECU 100 for the driving apparatus corresponds to "vehicle control apparatus" recited in the appended claims.

The wireless communication portion 150a is configured to receive the updated control program transmitted from the server 160 via a wireless communication network, and to temporarily store the received updated control program.

The transmission/reception portion 150b is configured to transmit, to the transmission/reception portion 100e, an inquiry signal for inquiring whether the ignition signal IG of the vehicle 10 has been switched from its OFF state to its ON state. When the ignition switch 94 is turned off, the ignition signal IG is placed in the OFF state for sopping the device force sources, whereby the engine 12 and the first and second rotating machines MG1, MG2 as the drive force sources are placed in their stopped states. When the ignition switch 94 is turned on, the ignition signal IG is placed in the ON state for starting the drive force sources, whereby the engine 12 and the first and second rotating machines MG1, MG2 as the drive force sources are placed in respective states in each of which the drive force is outputtable from a corresponding one of the engine 12 and the first and second rotating machines MG1, MG2.

When the transmission/reception portion 100e has received the inquiry signal transmitted from the transmission/reception portion 150b, the IG determination portion 100f determines whether the ignition signal IG has been switched from the OFF state to the ON state.

When it is determined by the IG determination portion 100f that the ignition signal IG has been switched from the OFF state to the ON state, the transmission/reception portion 100e transmits, to the transmission/reception portion 150b, a switch signal indicating that the ignition signal IG has been switched from the OFF state to the ON state.

When the transmission/reception portion 150b has received the switch signal transmitted from the transmission/reception portion 100e, the program transmission portion 150c transmits, to the program reception portion 100g, the updated control program that had been temporarily stored. Further, the program transmission portion 150c transmits, to the program reception portion 100g, a rewrite command signal that commands each of the correction values CMP to be rewritten or to be not rewritten. That is, the rewrite command signal is a command signal that commands the learning-data rewrite portion 100k to rewrite or not rewrite each of the correction values CMP by which the respective parameters are to be corrected. For example, when only the linear solenoid valve SL2 has been replaced, the rewrite command signal commanding only one of the correction values CMP to be written is transmitted to the program reception portion 100g, wherein the one of the correction values CMP is the correction value CMP by which the Pc2 drive current IDRc2 is to be corrected. As described above, the Pc2 drive current IDRc2 is a drive current by which the hydraulic pressure outputted from the linear solenoid valve SL2 is to be controlled. Further, for example, when an entirety of the transmission device 40 including the step-variable transmission portion 20 has been repaired or replaced, the rewrite command signal commanding ones of the correction values CMP to be written is transmitted to the program reception portion 100g, wherein the ones of the correction values CMP are the correction values CMP by each of which the drive current value IDRw is to be corrected. As described above, the drive current value IDRw is a drive current value by which the hydraulic pressure outputted from each of all the linear solenoid valves is to be controlled. Thus, the plurality of parameters, which are subjected to learning operation, are to be corrected by the respective correction values CMP, and at least one of the correction values CMP is assigned to be rewritten each time when the control program is updated.

When the updated control program is received by the program reception portion 100g, the program update portion 100h updates the control program stored in the program storage portion 100a, to the updated control program received by the program reception portion 100g.

The update determination portion 100i is configured to determine whether the control program stored in the program storage portion 100a is to be updated or not. For example, when the updated control program has been transmitted from the server 160 to the first gateway ECU 150, and the control program is to be updated by the program reception portion 100g and the program update portion 100h, the update determination portion 100i determines that the control program is to be updated. On the other hand, for example, when the updated control program has not been transmitted from the server 160 to the first gateway ECU 150, and the control program is not to be updated by the program reception portion 100g and the program update portion 100h, the update determination portion 100i determines that the control program is not to be updated.

When it is determined by the update determination portion 100i that the control program is to be updated, the rewrite determination portion 100j makes a determination as to whether there is a rewrite command that commands at least one of the correction values CMP stored in the learning-data storage portion 100d, to be rewritten. This determination is made based on, for example, the rewrite command signal transmitted from the program transmission portion 150c.

When it is determined by the rewrite determination portion 100j that there is the rewrite command that commands at least one of the correction values CMP to be to be rewritten, the learning-data rewrite portion 100k rewrites the at least one of the correction values CMP stored in the learning-data storage portion 100d. The learning-data rewrite portion 100k executes a rewriting operation for rewriting each of the at least one of the correction values CMP from a pre-update correction value (that is the correction value CMP shortly before rewriting) CMP_bfr to a post-update correction value (that is the correction value CMP immediately after rewriting) CMP_aft, such that the post-update correction value CMP_aft has the same sign (i.e., the same positive or negative sign) as the pre-update correction value CMP_bfr, and an absolute value of the post-update correction value CMP_aft is smaller than an absolute value of the pre-update correction value CMP_bfr. For example, the post-update correction value CMP_aft may be a value obtained by multiplying the pre-update correction value CMP_bfr by a correction coefficient k (0<k<1). Therefore, by the rewriting operation, a post-update learning value LRN_aft, which is each of at least one parameter corrected by the post-update correction value CMP_aft, is set between a pre-update learning value LRN_bfr, which is the each of the at least one parameter corrected by the pre-update correction value CMP_bfr, and a pre-learning set value SET which is the each of the at least one parameter before start of the execution of the in-field learning operation. It is noted that the pre-update correction value CMP_bfr is the correction value CMP shortly before the control program is updated, namely, the correction value CMP that is learned or obtained by the in-field learning operation executed the last time before the update of the control program, and that the post-update correction value CMP_aft is the correction value CMP immediately after the control program is updated, namely, the correction value CMP that is not yet subjected to the in-field learning operation executed the first time after the update of the control program. It is further noted that the above expression that "before start of the execution of the in-field learning operation" is interpreted to mean "before start of the execution of the in-field learning operation that is repeatedly executed", namely, "in a stage when the in-field learning operation is not yet executed even a single time".

Figure 11:
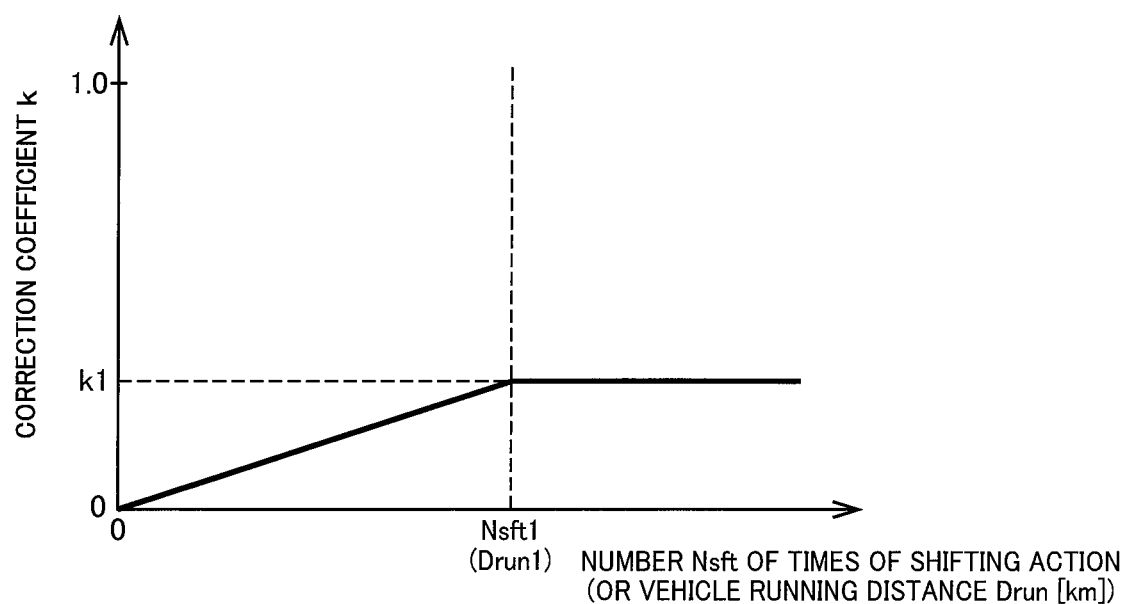
FIG. 11 is a view, showing by way of example, a relationship between the correction coefficient and a number of times of the shifting action, when the correction value is rewritten.

FIG. 11 is a view, showing by way of example, a relationship between the correction coefficient k and a number Nsft of times of the shifting action, when the correction value CMP is rewritten. The number Nsft of times of the shifting action is a cumulative number of times of the shifting action of the step-variable transmission portion 20, which has been executed together with the execution of the in-field learning operation for learning the correction value CMP, and which has been executed in the same conditions in terms of a combination of the gear positions before and after the shifting action and a range of the throttle valve opening degree θth, after the step-variable transmission portion 20 included in the transmission device 40 provided in the vehicle 10 had been started to be practically used for the first time (for example, after the vehicle 10 had been shipped from a factory, or after the vehicle 10 in which the transmission device 40 including the step-variable transmission portion 20 had been repaired or replaced with a new one had been delivered). The number Nsft of times of the shifting action is an index of a degree of progress of the in-field learning operation. The degree of progress of the in-field learning operation is a degree of progress of learning in the in-field learning operation. The degree of progress of the in-field learning operation is increased with increase of the number of times of execution of the in-field learning operation, and the learning value LRN becomes close to the above-described certain rage or is converged into the certain range, as the number of times of execution of the in-field learning operation is increased.

As shown in FIG. 11, the correction coefficient k is gradually increased from 0 (zero) to a coefficient value k1 (0<k1<1) at a constant rate, as the number Nsft of times of the shifting action is increased from 0 (zero) to a certain number Nsft1 of times. Then, after the number Nsft of times of the shifting action has reached the certain number Nsft1 of times, the correction coefficient k is kept at the coefficient value k1. This means that the correction coefficient k is gradually increased with increase of the number of times of execution of the in-field learning operation, until the number of times of execution of the in-field learning operation reaches the certain number Nsft1 of times, and then is kept at the coefficient value k1 as a constant value, after the number of times of execution of the in-field learning operation has reached the certain number Nsft1 of times, because the number Nsft of times of the shifting action is equal to the number of times of execution of the in-field learning operation. Thus, the correction coefficient k is gradually increased from 0 (zero) with increase of the number of times of execution of the in-field learning operation, and is then saturated to a value smaller than 1 (one). A difference $\Delta$CMP [A] (=CMP_bfr−CMP_aft=(1−k)×CMP_bfr) between the pre-update correction value CMP_bfr and the post-update correction value CMP_aft is changed depending on the degree of progress of the in-field learning operation. When the in-field learning operation has been executed, namely, the number Nsft of times of the shifting action is at least one (Nsft>0), the correction value CMP is not returned to 0 (zero) that is before start of execution of the in-field learning operation, although an influence on the correction value CMP from learning result of the in-field learning operation is partially reduced.

When it is determined by the rewrite determination portion 100$j$ that there is not the rewrite command that commands at least one of the correction values CMP to be to be rewritten, the learning-data rewrite portion 100$k$ does not rewrite the correction values CMP stored in the learning-data storage portion 100$d$.

Figure 12:
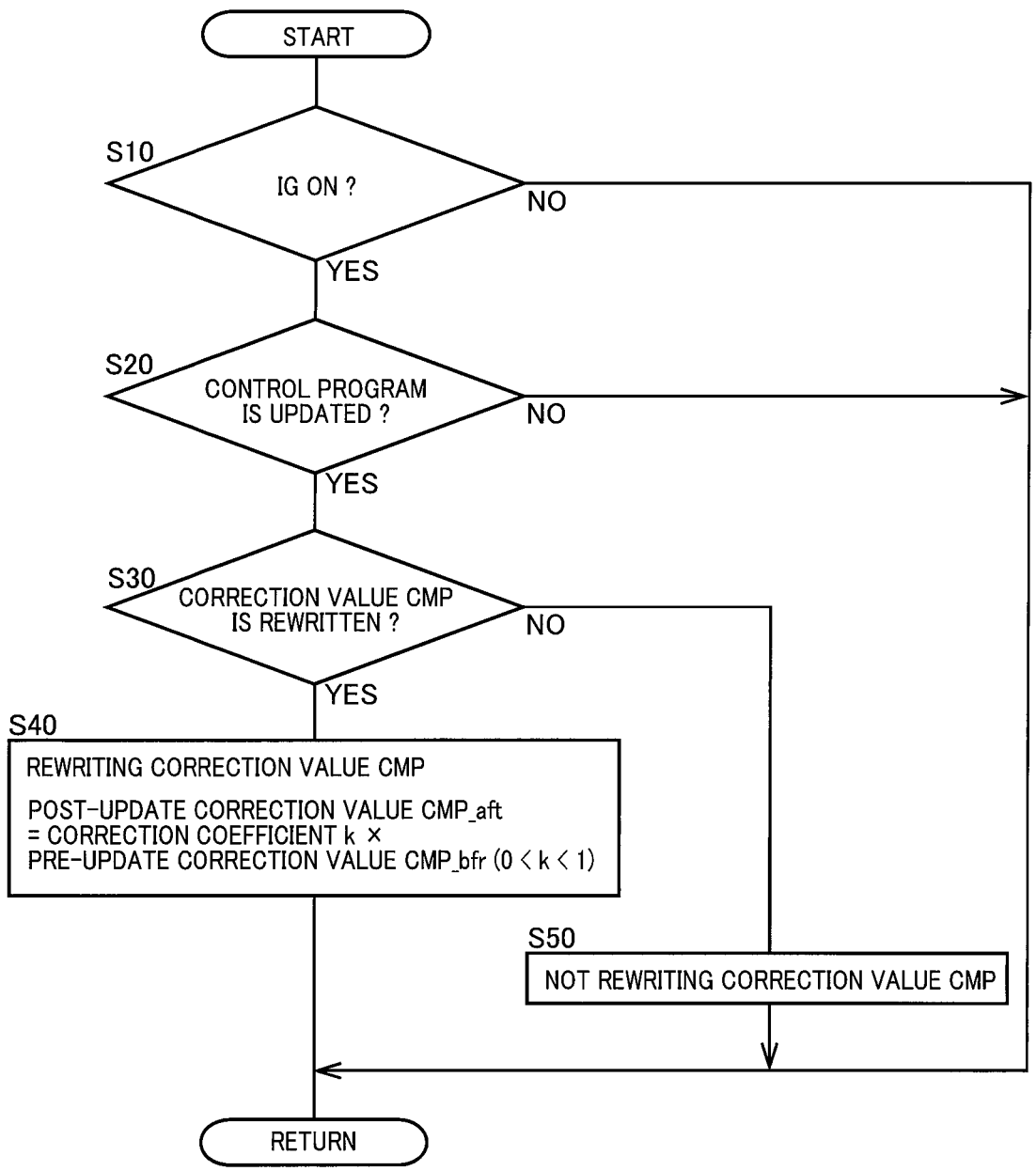
FIG. 12 is a flow chart showing, by way of example, a control routine executed by the ECU shown in FIG. 1, for explaining a major portion of a control operation of the ECU for the driving apparatus.

FIG. 12 is a flow chart showing, by way of example, a control routine executed by the ECU 100 shown in FIG. 1, for explaining a major portion of a control operation of the ECU 100 for the driving apparatus. This control routine shown by the flow chart of FIG. 12 is executed in a repeated manner.

The control routine is initiated with step S10 corresponding to function of the IG determination portion 100$f$, which is implemented to determine whether the ignition signal IG is switched from the OFF state to the ON state. When an affirmative determination is made at step S10, step S10 is followed by step S20. When a negative determination is made at step S10, one cycle of execution of the control routine is terminated.

At step S20 corresponding to function of the update determination portion 100$i$, it is determined whether the control program is updated or not. When an affirmative determination is made at step S20, step S20 is followed by step S30. When a negative determination is made at step S20, one cycle of execution of the control routine is terminated.

At step S30 corresponding to function of the rewrite determination portion 100$j$, it is determined whether the rewrite command has been issued to rewrite at least one of the correction values CMP. When an affirmative determination is made at step S30, step S30 is followed by step S40. When a negative determination is made at step S30, the control flow goes to step S50.

At step S40 corresponding to function of the learning-data rewrite portion 100$k$, the at least one of the correction values CMP is rewritten from the pre-update correction value CMP_bfr to the post-update correction value CMP_aft. For example, the post-update correction value CMP_aft is a value obtained by multiplying the pre-update correction value CMP_bfr by the correction coefficient k (0<k<1). When it is determined at step S10 that the ignition signal IG is switched from the OFF state to the ON state, the at least one of the correction values CMP is rewritten at step S40.

At step S50 corresponding to function of the learning-data rewrite portion 100$k$, the correction values CMP are not rewritten. After implementation of step S40 or step S50, one cycle of one cycle of execution of the control routine is terminated.

In the present embodiment, the ECU 100 as the vehicle control apparatus includes (a) the program storage portion 100$s$ configured to store the control program; (b) the learning-data storage portion 100$d$ configured to store, as learning data, the at least one correction value CMP obtained after the start of the execution of the learning operation; and (c) the learning-data rewrite portion 100$k$ configured, when the control program is updated, to execute a rewriting operation for rewriting the at least one correction value CMP as the learning data from a pre-update correction value CMP_bfr to a post-update correction value CMP_aft, such that the post-update correction value CMP_aft has the same sign as the pre-update correction value CMP_bfr, and an absolute value of the post-update correction value CMP_aft is smaller than an absolute value of the pre-update correction value CMP_bfr. Owing to this arrangement, as compared with an arrangement in which the same value of the pre-update correction value CMP_bfr is used as the post-update correction value CMP_aft, a degree of influence of the pre-update correction value CMP_bfr on the post-update correction value CMP_aft is reduced thereby making it possible to suppress a problem that the vehicle 10 cannot be appropriately controlled in the stage shortly after the update of the control program, more specifically, suppress a problem that the shifting shock cannot be held in the permissible range in the stage shortly after the update of the control program.

In the present embodiment, the post-update learning value LRN_aft, which is the at least one parameter corrected by the post-update correction value CMP_aft, is set between the pre-update learning value LRN_bfr, which is the at least one parameter corrected by the pre-update correction value CMP_bfr, and the pre-learning set value SET which is the at least one parameter before the start of the execution of the learning operation. This means that a degree of influence of the pre-learning set value SET on the post-update learning value LRN_aft is maintained while a degree of influence of the pre-update correction value CMP_bfr on the post-update learning value LRN_aft is reduced. Owing to this arrangement, as compared with an arrangement in which the learning operation is executed from the beginning after the update of the control program, namely, is restarted from scratch after the update, it is possible to more easily suppress the problem that the vehicle 10 cannot be appropriately controlled in the stage shortly after the update of the control program.

In the present embodiment, the learning-data rewrite portion 100k is configured to change the difference ΔCMP between the pre-update correction value CMP_bfr and the post-update correction value CMP_aft, depending on the degree of progress of the learning operation executed before update of the control program. When the degree of progress of the learning operation is low, the degree of reliability of the pre-update correction value CMP_bfr is likely to be low. When the degree of progress of the learning operation is high, the degree of reliability of the pre-update correction value CMP_bfr is likely to be high. Therefore, the degree of influence of the pre-update correction value CMP_bfr on the post-update correction value CMP_aft is changed depending on the degree of the progress of the learning operation executed before the update of the control program, namely, depending on the degree of reliability of the pre-update correction value CMP_bfr. Owing to this arrangement taking account of the degree of reliability of the pre-update correction value CMP_bfr, it is possible to more easily suppress the problem that the vehicle 10 cannot be appropriately controlled in the stage shortly after the update of the control program.

In the present embodiment, the at least one parameter subjected to the in-field learning operation includes the drive current value IDRw that is to be applied to the step-variable transmission portion 20 included in the transmission device 40, so as to execute the shift control operation of the step-variable transmission portion 20. Owing to this arrangement, it is possible to suppress increase of the shifting shock caused when the shifting action is executed in the step-variable transmission portion 20 in the stage shortly after the update of the control program.

In the present embodiment, the drive current value IDRw as the parameter is prepared for each of various combinations of the gear positions before and after the shifting action and various ranges of the throttle valve opening degree θth, so that the at least one parameter consists of a plurality of parameters that are corrected by respective correction values CMP as the at least one correction value, wherein the learning-data rewrite portion 100k is configured, when executing the rewriting operation, to rewrite at least one of the correction values CMP from the pre-update correction value CMP_bfr to the post-update correction value CMP_aft. Upon update of the control program, the at least one of the correction values CMP is determined or designated to be rewritten from the pre-update correction value CMP_bfr to the post-update correction value CMP_aft. With the at least one of the correction values CMP, by which the parameter or parameters related to the update of the control program are to be corrected, being assigned to be rewritten upon the update of the control program, it is possible to cause the other of the correction values CMP, by which the parameter or parameters not related to the update of the control program are to be corrected, to be not assigned to be rewritten, so that each of the other of the correction values CMP is kept at the pre-update correction value CMP_bfr even after the update of the control program.

In the present embodiment, the ECU 100 as the vehicle control apparatus further includes the IG determination portion 100f configured to determine whether the ignition signal IG has been switched from the OFF state to the ON state. When it is determined by the IG determination portion 100f that the ignition signal IG has been switched from the OFF state to the ON state, the learning-data rewrite portion 100k executes the rewriting operation. Owing to this arrangement in which the learned correction value CMP is rewritten when the ignition signal IG is switched from the OFF state to the ON state, it is possible to reduce an uncomfortable feeling given to a driver of the vehicle 10, as compared with an arrangement in which the correction value CMP is rewritten during running of the vehicle 10.

Second Embodiment

Figure 13:
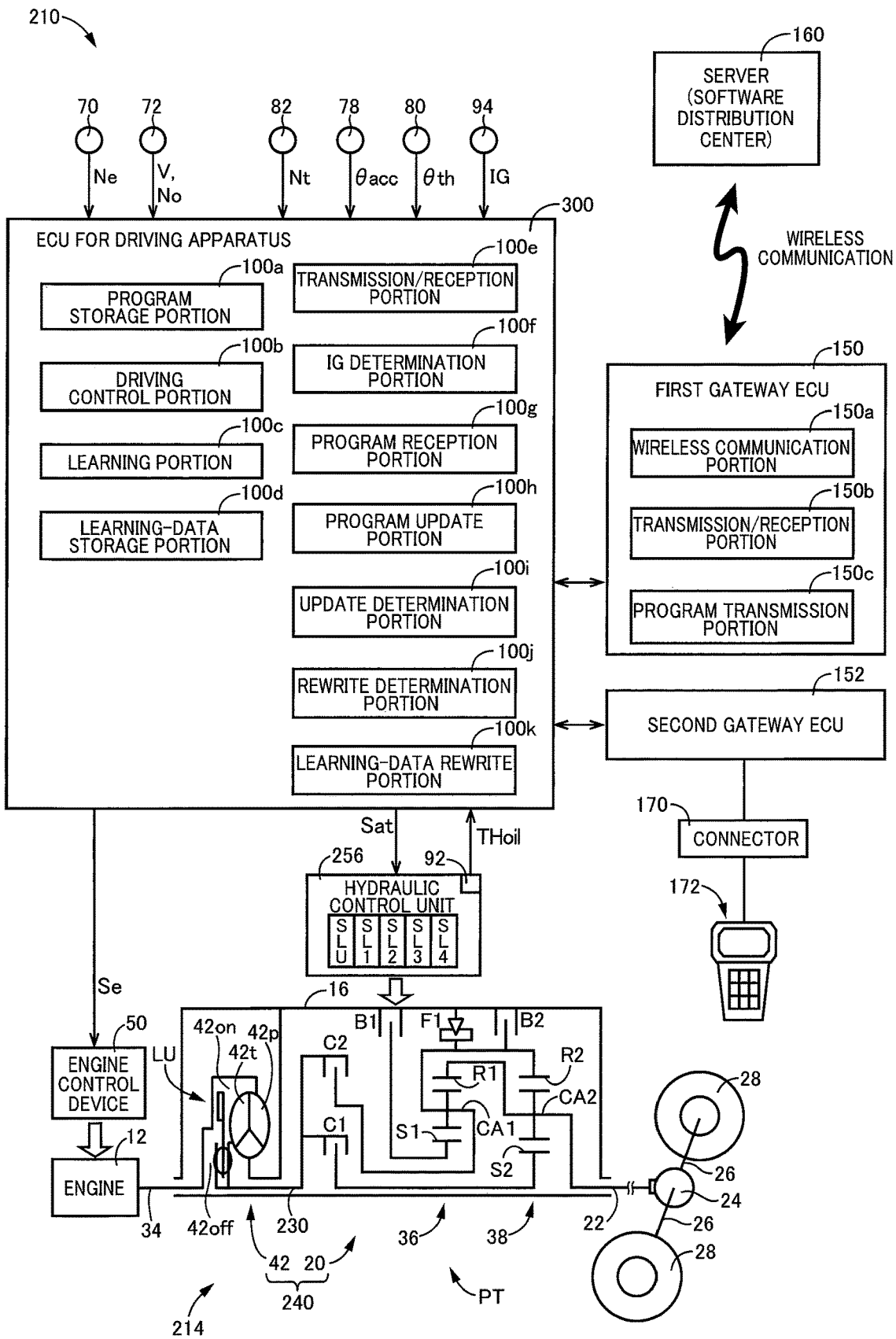
FIG. 13 is a view schematically showing a construction of a vehicle provided with an ECU for a driving apparatus, which is constructed according to a second embodiment of the present invention, and is a functional block diagram showing major portions of control functions for various control operations executed in the vehicle.

FIG. 13 is a view schematically showing a construction of a vehicle 210 provided with an ECU 300 for a driving apparatus, which is constructed according to a second embodiment of the present invention, and is a functional block diagram showing major portions of control functions for various control operations executed in the vehicle 210. The vehicle 210 in this second embodiment has substantially the same construction as the vehicle 10 in the above-described first embodiment, but different from the vehicle 10 in that the above-described transmission device 40, hydraulic control unit 56 and ECU 100 are replaced by a transmission device (composite transmission) 240, a hydraulic control unit 256 and the ECU 300, respectively. Therefore, in the following description of this second embodiment, there will be described mainly elements different from the first embodiment. The same reference signs as used in the first embodiment will be used in the following second embodiment, to identify the functionally corresponding elements, and descriptions thereof are not provided. It is noted that the ECU 300 corresponds to "vehicle control apparatus" recited in the appended claims.

The vehicle 210 includes a drive-force transmitting device 214 in addition to the engine 12, drive wheels 28, ECU 300 and first and second gateway ECUs 150, 152.

The drive-force transmitting device 214 includes a torque convertor 42 that is a fluid-operated type drive-force transmitting device, in addition to the step-variable transmission portion 20 and other components, such that the torque convertor 42 and the step-variable transmission portion 20 are arranged in a series on a common axis, and cooperate with each other to constitute the transmission device 240. In the drive-force transmitting device 214, the torque convertor 42, step-variable transmission portion 20, differential gear device 24 and pair of axles 26 cooperate to constitute a drive-force transmitting path PT that is provided between the engine 12 and the drive wheels 28. It is noted that the transmission device 240 including the torque convertor 42 and the step-variable transmission portion 20 corresponds to "transmission" recited in the appended claims.

The torque convertor 42 includes a pump impeller 42p connected to the engine 12 through the connecting shaft 34 and a turbine impeller 42t connected to the step-variable transmission portion 20 through an intermediate transmitting member 230. The torque converter 42 is provided with a lockup clutch LU disposed between the pump impeller 42p and the turbine impeller 42t, so that the pump impeller 42p and the turbine impeller 42t are to be rotated integrally with each other when the lockup clutch LU is engaged. The torque convertor 42 has an engaging-side fluid chamber 42on and a releasing-side fluid chamber 42off, such that the hydraulic pressure is to be supplied to the engaging-side fluid chamber 42on for engaging the lockup clutch LU and such that the hydraulic pressure is to be supplied to the releasing-side fluid chamber 42off for releasing the lockup clutch LU.

The hydraulic control unit 256 includes, in addition to the linear solenoid valves SL1-SL4 and other components that are provided also in the above-described hydraulic control unit 56, a linear solenoid valve SLU for executing a lockup-clutch control operation. The linear solenoid valve SLU is to be energized by a drive current IDRlu [A] that is to be controlled in accordance with the hydraulic control command signal Sat supplied from the ECU 300 to the hydraulic control unit 256. With the drive current IDRlu being controlled, an SLU output pressure Pslu [Pa] as an output pressure of the linear solenoid valve SLU is controlled. With the SLU output pressure Pslu being controlled, a lockup differential pressure Pdif [Pa], which is a pressure difference between the hydraulic pressure supplied to the engaging-side fluid chamber 42on and the hydraulic pressure supplied to the releasing-side fluid chamber 42off, is controlled. With the lockup differential pressure Pdif being controlled, an operation state of the lockup clutch LU is to be switched among a released state, a slipping state and an engaged state. Thus, the operation state of the lockup clutch LU is switched with the drive current IDRlu of the linear solenoid valve SLU being controlled.

The ECU 300 receives various input signals based on values detected by respective sensors provided in the vehicle 210. Specifically, the electronic control apparatus 90 receives: the output signal of the engine speed sensor 70 indicative of the engine rotational speed Ne; the output signal of the output speed sensor 72 indicative of the output-shaft rotational speed No; an output signal of a turbine speed sensor 82 indicative of a turbine rotational speed Nt [rpm] that is a rotational speed of the turbine impeller 42t of the torque convertor 42, the output signal of the accelerator-opening degree sensor 78 indicative of the acceleration opening degree θacc; the output signal of the throttle-opening degree sensor 80 indicative of the throttle opening degree θth; the output signal of the fluid temperature sensor 92 indicative of the working fluid temperature THoil in the hydraulic control unit 256; and the ignition signal IG of the ignition switch 94.

The ECU 300 generates various output signals to the various devices provided in the vehicle 210, such as: the engine control command signal Se that is to be supplied to the engine control device 50 for controlling the engine 12; and the hydraulic control command signal Sat that is to be supplied to the hydraulic control unit 256 for controlling the operation states of the hydraulically-operated frictional engagement devices CB and the operation state of the lockup clutch LU.

Like the ECU 100 in the above-described first embodiment, the ECU 300 functionally includes the program storage portion 100a, driving control portion 100b, learning portion 100c, learning-data storage portion 100d, transmission/reception portion 100e, IG determination portion 100f, program reception portion 100g, program update portion 100h, update determination portion 100i, rewrite determination portion 100j and learning-data rewrite portion 100k. It is noted that the ECU 300 corresponds to "vehicle control apparatus" recited in the appended claims.

Hereinafter, regarding the learning of the drive current IDRlu supplied to the linear solenoid valve SLU in the execution of the engagement control operation for placing the lockup clutch LU of the torque convertor 42 from the released state into the engaged state, there will be described a learning operation, by way of example, which is executed when the pack clearance is eliminated in the lockup clutch LU. With the execution of the learning operation upon elimination of the pack clearance in the lockup clutch LU, it is possible to suppress an engaging shock caused in the execution of the engagement control operation for the lockup clutch LU.

Figure 14:
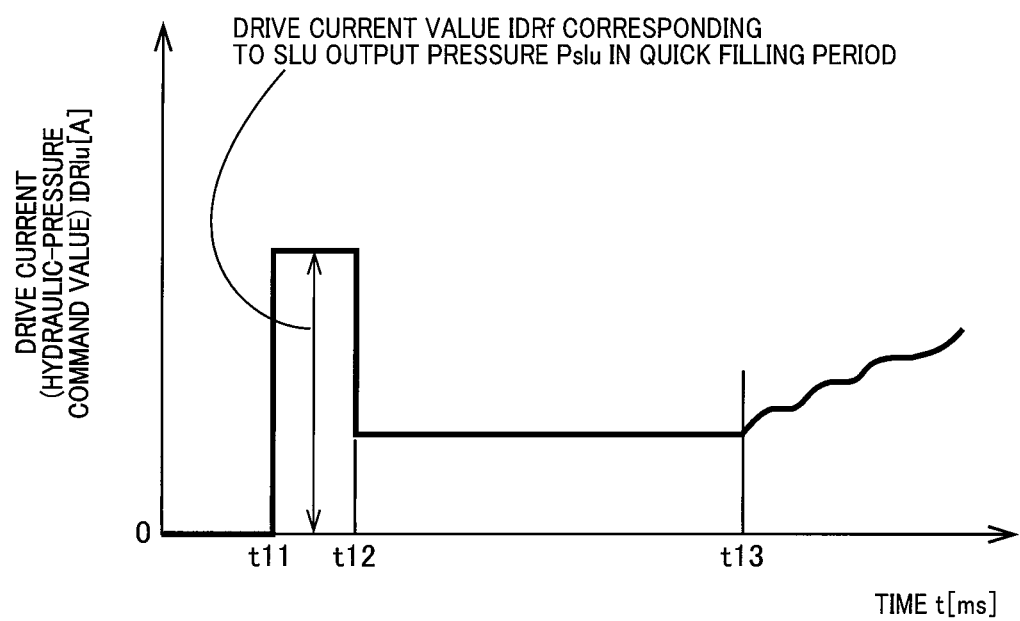
FIG. 14 is a time chart for explaining, by way of example, an operation of a linear solenoid valve during execution of an engagement control operation for a lockup clutch, more specifically, showing, by way of example, a change of the drive current applied to the linear solenoid valve in process of engagement of the lockup clutch.

FIG. 14 is a time chart for explaining, by way of example, an operation of the linear solenoid valve SLU during execution of the engagement control operation for the lockup clutch LU, more specifically, showing, by way of example, a change of the drive current IDRlu applied to the linear solenoid valve SLU in process of the engagement of the lockup clutch LU. Since the SLU output pressure Pslu as an output pressure of the linear solenoid valve SLU is dependent on the drive current IDRlu applied to the linear solenoid valve SLU, the drive current IDRlu can be a hydraulic-pressure command value for the SLU output pressure Pslu, like the drive current IDR that can be a hydraulic-pressure command value for the output pressure PSL of the linear solenoid valve SL in the above-described first embodiment, as described above with reference to FIG. 7.

As shown in FIG. 14, in a period (quick filling period) from a time point t11 to a time point t12, the drive current IDRlu is temporarily increased to eliminate the pack clearance. Then, in a period (constant stand-by pressure period) from the time point t12 to a time point t13, the drive current IDRlu is kept at a current value corresponding to a constant stand-by pressure by which the lockup clutch LU is held in its engagement stand-by state. The pack clearance is reduced so as to be eliminated in a period from a start point (time point t11) of the quick filling period to a start point (time point t13) of an inertia phase via a start point (time point t12) of the constant stand-by pressure period, namely, in a period to a time point at which the lockup clutch LU starts to be in the slipping state. The start point of the inertia phase is detected as a time point at which the turbine rotational speed Nt starts to be changed toward the engine rotational speed Ne. In a period from the time point t13 as the start point of the inertia phase to a time point at which the lockup clutch LU is placed into the engaged state, the slipping of the lockup clutch LU is subjected to a feedback control or the like, for example, such that the lockup clutch LU has a required torque capacity. In the time chart of FIG. 14, a relationship between the drive current IDRlu and the time tin process of engagement of the lockup clutch LU is shown, wherein the drive current IDRlu is the parameter used for the engagement control operation for engaging the lockup clutch LU. For example, the drive current value IDRf corresponding to the SLU output pressure Pslu in the quick filling period (see FIG. 14) is the parameter subjected to the learning operation. It is noted that the drive current value IDRf corresponds to "hydraulic-pressure command value" recited in the appended claims.

The learning portion 100c executes the in-factory learning operation and the in-field learning operation, when the pack clearance is eliminated in the lockup clutch LU, such that an actual inertia starting time Td [ms] (=t13–t11), which is a length of time until the inertia phase actually starts, is within a target range. The target range of the actual inertia starting time Td is a predetermined range that is determined through experimentation or determined by an appropriate design theory, such that the engaging shock and a length of time required to complete the engagement of the lockup clutch LU in the engagement control operation are in respective permissible ranges.

Specifically, when the actual inertia starting time Td is longer than the target range, it is assumed that a length of time for the elimination of the pack clearance is too large. Therefore, in the next execution of the engagement control operation, the drive current value IDRf in the quick filling period is made larger than the drive current value IDRf in the present execution of the engagement control operation, by a correction amount as a predetermined amount by which the drive current value IDRf is to be changed in each one execution of the learning operation. That is, in the next execution of the pack clearance elimination, the drive current value IDRf is made larger than the drive current value IDRf in the present execution of the pack clearance elimination, by the correction amount. On the other hand, when the actual inertia starting time Td is shorter than the target range, it is assumed that the length of time for the elimination of the pack clearance is too small. Therefore, in the next execution of the engagement control operation, the drive current value IDRf in the quick filling period is made smaller than the drive current value IDRf in the present execution of the engagement control operation by the correction amount by which the drive current value IDRf is to be changed in each one execution of the learning operation. That is, in the next execution of the pack clearance elimination, the drive current value IDRf is made smaller than the drive current value IDRf in the present execution of the pack clearance elimination, by the correction amount.

The lockup differential pressure Pdif is controlled by the drive current IDRlu applied to the linear solenoid valve SLU. The engagement characteristic of the lockup clutch LU varies depending on also various conditions such as the engine rotational speed Ne, the turbine rotational speed Nt, a differential rotation $\Delta$N [rpm] (=Ne–Nt) corresponding to a difference between the engine rotational speed Ne and the turbine rotational speed Nt, a hydraulic pressure [Pa] of the working fluid supplied to the releasing-side fluid chamber 42off, the working fluid temperature Thoil and an engine torque Te [Nm] that is an output of the engine 12. Therefore, the in-field learning operation may be executed for each range of each of these conditions.

By execution of the in-factory learning operation, the drive current value IDRf is corrected from the standard current value STN to a corrected current value that is obtained by adding the in-factory correction amount to the standard current value STN. The corrected current value, which is obtained by adding the in-factory correction amount to the standard current value STN, is stored as the pre-learning set value SET before the in-field learning operation, into the learning-data storage portion 100d. Further, the correction value CMP as the total of the correction amounts in the respective executions of the in-field learning operation is also stored into the learning-data storage portion 100d. It is noted that the pre-learning set value SET before the in-field learning operation and the correction value CMP after the in-field learning operation correspond to "pre-learning set value" and "correction value", respectively, which are recited in the appended claims.

In this second embodiment, the learning-data rewrite portion 100k is configured, when the control program is updated, to execute the rewriting operation for rewriting the correction value CMP for the drive current value IDRf, as the learning-data rewrite portion 100k executes the rewriting operation for rewriting the correction value CMP for the drive current value IDRw in the above-described first embodiment. The difference $\Delta$CMP between the pre-update correction value CMP_bfr and the post-update correction value CMP_aft is changed depending on the degree of the progress of the in-field learning operation executed before update of the control program. As the degree of progress of the in-field learning operation, for example, it is possible to use a number Nluon of times of the engaging action, which is a cumulative number of times of the engaging action of the lockup clutch LU since the torque convertor 42 included in the transmission device 240 provided in the vehicle 210 had been started to be practically used for the first time. When it is determined by the IG determination portion 100f that the ignition signal IG has be switched from the OFF state to the ON state, the learning-data rewrite portion 100k executes the rewriting operation for the correction value CMP.

In the present second embodiment, the parameter subjected to the in-field learning operation is the drive current value IDRf for switching the operation state of the lockup clutch LU included in the torque convertor 42 provided in the transmission device 240, and it is possible to obtain substantially the same effects as in the above-described first embodiment. For example, as compared with an arrangement in which the same value of the pre-update correction value CMP_bfr is used as the post-update correction value CMP_aft, a degree of influence of the pre-update correction value CMP_bfr on the post-update correction value CMP_aft is reduced thereby making it possible to suppress a problem that the vehicle 210 cannot be appropriately controlled in a stage shortly after the update of the control program, more specifically, suppress a problem that the engaging shock of the lockup clutch LU cannot be held in the permissible range in the stage shortly after the update of the control program.

While the preferred embodiments of this invention have been described in detail by reference to the drawings, it is to be understood that the invention may be otherwise embodied.

In the above-described first and second embodiments, the number Nsft of times of the shifting action and the number Nluon of times of the engaging action are used as the degree of progress of the in-field learning operation. However, it is not essential. For example, as the degree of progress of the in-field learning operation, a vehicle running distance Drun [km] may be used in place of the number Nsft of times of the shifting action and the number Nluon of times of the engaging action. The running distance Drun is a running distance of the vehicle 10 for which the vehicle 10 has run since the step-variable transmission portion 20 included in the transmission device 40 provided in the vehicle 10 had been started to be practically used for the first time, or is a running distance of the vehicle 210 for which the vehicle 210 has run since the torque convertor 42 included in the transmission device 240 provided in the vehicle 210 had been started to be practically used for the first time. As indicated in parentheses in FIG. 11, the correction coefficient k is gradually increased from 0 (zero) to a coefficient value k1 (0<k1<1) at a constant rate, as the running distance Drun is increased from 0 (zero) [km] to a certain distance Drun1 [km]. Then, after the running distance Drum reached the certain distance Drun1, the correction coefficient k may be kept at the coefficient value k1. In general, the longer the running distance Drun is, the larger the number Nsft of times of the shifting action and the number Nluon of times of the engaging action are, namely, the longer the running distance Drun is, the larger the number of times of execution of the in-field learning operation is. On the other hand, the shorter the running distance Drun is, the smaller the number Nsft of times of the shifting action and the number Nluon of times of the engaging action are, namely, the shorter the running distance Drun is, the smaller the number of times of execution of the in-field learning operation is. Therefore, the longer the running distance Drun is, the higher the degree of progress of the in-field learning operation is. On the other hand, the shorter the running distance Drun is, the lower the degree of progress of the in-field learning operation is. For example, when the running distance Drun is smaller than a certain distance Drun1, namely, when the number of times of execution of the in-field learning operation is likely to be small, the correction coefficient k is increased with increase of the running distance Drun. When the running distance Drun is not smaller than the certain distance Drun1, the correction coefficient k is kept at the correction coefficient k as a constant value, irrespective of the running distance Drun.

In the above-described first embodiment, the drive current value IDRw corresponding to the constant stand-by pressure applied to the engaging-side hydraulically-operated frictional engagement device in the "clutch-to-clutch" shifting operation, is the parameter subjected to the learning operation. However, this arrangement is not essential. For example, the parameter subjected to the learning operation may be the drive current valve of the drive current IDR for eliminating the pack clearance in the period from the time point t1 to the time point t2 shown in the time chart of FIG. 8, a length of time of the period from the time point t1 to the time point t2 in which the drive current IDR for the elimination of the pack clearance is outputted, or a length of time of the period from the time point t2 to the time point t3 in which the constant stand-by pressure is outputted. In the above-described second embodiment, the drive current value IDRf applied to eliminate the pack clearance in the lockup clutch LU in the quick filling period, is the parameter subjected to the learning operation. However, this arrangement is not essential. For example, the parameter subjected to the learning operation may be the drive current valve of the drive current IDR in the period (constant stand-by pressure period) from the time point t12 to the time point t13 shown in the time chart of FIG. 14, a length of time of the quick filling period, or a length of time of the constant stand-by pressure period. Further, the parameter subjected to the learning operation does not have to be necessarily a parameter used for controlling the engaging-side hydraulically-operated frictional engagement device of the step-variable transmission portion 20 included in the transmission devices 40, 240 and the lockup clutch LU of the torque convertor 42, but may be, for example, a fuel injection amount, a fuel injection timing and an ignition timing in the engine control device 50 for controlling the engine 12. Thus, the term "parameter" is interpreted to mean a control value by which a component (such as the transmission devices 40, 240 and the engine 12) is to be controlled either directly or indirectly. With such a control value being corrected by the in-field learning operation, operation of the controlled component is changed.

In the above-described first and second embodiments, there is not provided a guard value GD [A] for preventing an erroneous learning in the in-field learning operation. However, the guard value GD may be provided. Specifically described, in a case in which an absolute value of the correction value CMP as a total of the correction amounts in respective executions of the in-field learning operation falls outside a range defined by the guard value GD (>0), namely, when CMP<−GD or GD<CMP, the drive current value IDRw or the drive current value IDRf, which is subjected to the learning operation, is corrected by only an amount corresponding to the guard value GD, namely, only an amount corresponding to a minimum value (−GD) or a maximum value (GD) of the defined range. On the other hand, in a case in which the absolute value of the correction value CMP falls within the range defined by the guard value GD (>0), namely, when −GD≤CMP≤GD, the drive current value IDRw or the drive current value IDRf is corrected by the correction value CMP in the field learning operation. Thus, the guard value GD defines an upper limit of the absolute value of the correction value CMP that is the total of the correction amounts in respective executions of the in-field learning operation.

In the above-described first and second embodiments, the updated control program is transmitted through a wireless communication from the server 160 to the first gateway ECU 150, and then the updated control program is further transmitted from the first gateway ECU 150 to the ECU 100 or ECU 300, so that the control program stored in the ECU 100 or ECU 300 is updated. However, this arrangement is not essential. For example, it is possible to employ another arrangement in which the updated control program is transmitted from the update tool 172 to the second gateway ECU 152, and then the updated control program is further transmitted from the second gateway ECU 152 to the ECU 100 or ECU 300, so that the control program stored in the ECU 100 or ECU 300 is updated. The second gateway ECU 152 has substantially the same control functions as the first gateway ECU 150, but is different from the first gateway ECU 150 in that the updated control program is transmitted thereto via the connector 170 from the update tool 172 that is connected thereto through a wired channel rather than through a wireless channel. Therefore, the second gateway ECU 152 includes a wire communication portion in addition to the transmission/reception portion 150b and program transmission portion 150c, wherein the wire communication portion is capable of receiving data from the update tool 172.

In the above-described first embodiment, the vehicle 10 is the hybrid vehicle. In the above-described second embodiment, the vehicle 210 is the vehicle including only the engine 12 as the drive force source. However, the present invention is applicable also to a vehicle including only a rotating machine as the drive force source.

In the above-described first and second embodiments, the ECU 100, ECU 300 and first and second gateway ECUs 150, 152 are provided for controlling the driving apparatus and updating the control program. However, these arrangements are not essential. For example, a part or all of them may be functionally combined into a single ECU, as needed. Further, the control functions of each of the ECU 100, ECU 300 first and second gateway ECUs 150, 152 may be constituted by respective microcomputers, or at least one of the control functions of each of the ECU 100, ECU 300 first and second gateway ECUs 150, 152 may be constituted by an external memory, as needed.

It is to be understood that the embodiments described above are given for illustrative purpose only, and that the present invention may be embodied with various modifications and improvements which may occur to those skilled in the art.

NOMENCLATURE OF ELEMENTS

10; 210: vehicle
12: engine (drive force source)
40; 240: transmission device (transmission)
100; 300: ECU (vehicle control apparatus)
100a: program storage portion
100d: learning-data storage portion
100f: IG determination portion (ignition determination portion)
100k: learning-data rewrite portion
CMP: correction value
CMP_aft: post-update correction value
CMP_bfr: pre-update correction value
Drun: vehicle running distance (degree of progress of learning operation)
IDRf: drive current value (hydraulic-pressure command value)
IDRw: drive current value (hydraulic-pressure command value)
IG: ignition signal
LRN_aft: post-update learning value (learning value corrected by post-update correction value)
LRN_bfr: pre-update learning value (learning value corrected by pre-update correction value)
MG1: first rotating machine (drive force source)
MG2: second rotating machine (drive force source)
Nluon: number of times (degree of progress of learning operation)
Nsft: number of times of the shifting action (degree of progress of learning operation)
SET: set value (pre-learning set value)
ΔCMP: difference (difference between pre-update correction value and post-update correction value)

What is claimed is:

1. A vehicle control apparatus for controlling a vehicle through a control program using at least one parameter, the at least one parameter being corrected by respective at least one correction value that is obtained after start of execution of a learning operation,
the vehicle control apparatus comprising:
a program storage portion configured to store the control program;
a learning-data storage portion configured to store, as learning data, the at least one correction value obtained after the start of the execution of the learning operation; and
a learning-data rewrite portion configured, when the control program is updated, to execute a rewriting operation for rewriting the at least one correction value as the learning data from a pre-update correction value to a post-update correction value, such that the post-update correction value has the same sign as the pre-update correction value, and an absolute value of the post-update correction value is smaller than an absolute value of the pre-update correction value.

2. The vehicle control apparatus according to claim 1, wherein a post-update learning value, which is the at least one parameter corrected by the post-update correction value, is between a pre-update learning value, which is the at least one parameter corrected by the pre-update correction value, and a pre-learning set value which is the at least one parameter before the start of the execution of the learning operation.

3. The vehicle control apparatus according to claim 1, wherein the learning-data rewrite portion is configured to change a difference between the pre-update correction value and the post-update correction value, depending on a degree of progress of the learning operation executed before update of the control program.

4. The vehicle control apparatus according to claim 1, wherein the at least one parameter includes a hydraulic-pressure command value that is to be applied to a transmission of the vehicle.

5. The vehicle control apparatus according to claim 1, wherein the at least one parameter consists of a plurality of parameters that are corrected by respective correction values as the at least one correction value, and
wherein the learning-data rewrite portion is configured, when executing the rewriting operation, to rewrite at least one of the correction values from the pre-update correction value to the post-update correction value.

6. The vehicle control apparatus according to claim 1, wherein the vehicle includes a drive force source which is to be started when an ignition signal is placed in ON state, and which is to be stopped when the ignition signal is placed in OFF state,
the vehicle control apparatus further comprising an ignition determination portion configured to determine whether the ignition signal has been switched from the OFF state to the ON state, and
wherein the learning-data rewrite portion is configured, when it is determined by the ignition determination portion that the ignition signal has been switched from the OFF state to the ON state, to execute the rewriting operation.

* * * * *